(12) United States Patent
Dagan et al.

(10) Patent No.: US 12,433,600 B2
(45) Date of Patent: Oct. 7, 2025

(54) EMBOLIZATION CATHETER FOR REFLUX FREE DELIVERY OF MICROSPHERES

(71) Applicant: Argon Medical Devices, Inc., Plano, TX (US)

(72) Inventors: Tom Dagan, Omer (IL); Nir Holtzman, Rishon Lezion (IL); Yuval Zipory, Modiin (IL); Osnat Harbater, Raanana (IL); Eran Miller, Moshav Beit Elazari (IL)

(73) Assignee: Argon Medical Devices, Inc., Plano, TX (US)

( * ) Notice: Subject to any disclaimer, the term of this patent is extended or adjusted under 35 U.S.C. 154(b) by 1003 days.

(21) Appl. No.: 17/609,899

(22) PCT Filed: May 27, 2020

(86) PCT No.: PCT/IL2020/050594
§ 371 (c)(1),
(2) Date: Nov. 9, 2021

(87) PCT Pub. No.: WO2020/234889
PCT Pub. Date: Nov. 26, 2020

(65) Prior Publication Data
US 2022/0218358 A1 Jul. 14, 2022

Related U.S. Application Data

(60) Provisional application No. 62/852,009, filed on May 23, 2019.

(51) Int. Cl.
*A61B 17/12* (2006.01)
*A61M 25/00* (2006.01)

(52) U.S. Cl.
CPC ... *A61B 17/12186* (2013.01); *A61M 25/0052* (2013.01); *A61B 2017/1205* (2013.01); *A61M 2025/0042* (2013.01)

(58) Field of Classification Search
CPC .......... A61M 25/0045; A61M 25/0051; A61M 25/007; A61M 2025/0042;
(Continued)

(56) References Cited

U.S. PATENT DOCUMENTS 3,888,249 A 6/1975 Spencer
5,178,611 A 1/1993 Rosenberg
(Continued)

FOREIGN PATENT DOCUMENTS

CA 2382871 A1 3/2001
CN 102665608 A 9/2012
(Continued)

OTHER PUBLICATIONS

PCT International Search Report for International Application No. PCT/IL2020/050594, mailed Aug. 31, 2020, 3pp.
(Continued)

*Primary Examiner* — Kevin C Sirmons
*Assistant Examiner* — William R Frehe
(74) *Attorney, Agent, or Firm* — IpHorgan Ltd.

(57) ABSTRACT

An embolization microcatheter for delivery of embolization beads to a target area, the embolization microcatheter including a proximal end and a distal end, the distal end terminating in an end opening sized and shaped to allow delivery of a suspension of the embolization beads, and a filter section located in proximity to the end opening of the distal end; the filter section including a large plurality of openings distributed circumferentially around a wall thereof, the filter section configured to allow an outflow of the suspension while preventing an outflow of the embolization beads.

13 Claims, 13 Drawing Sheets

(58) Field of Classification Search
CPC .......... A61M 25/0052; A61M 25/0015; A61M 25/0043; A61B 2017/00893; A61N 5/1002; A61N 5/1007

See application file for complete search history.

(56) References Cited

U.S. PATENT DOCUMENTS

| | | | |
|---|---|---|---|
| 5,318,032 | A | 6/1994 | Lonsbury et al. |
| 5,573,520 | A | 11/1996 | Schwartz et al. |
| 5,601,539 | A | 2/1997 | Corso, Jr. |
| 5,749,894 | A | 5/1998 | Engleson |
| 5,817,057 | A | 10/1998 | Berenstein et al. |
| 5,833,671 | A | 11/1998 | Macoviak et al. |
| 5,964,223 | A | 10/1999 | Baran |
| 6,146,373 | A | 11/2000 | Cragg et al. |
| 6,280,434 | B1 | 8/2001 | Kinoshita et al. |
| 6,695,809 | B1 | 2/2004 | Lee |
| 8,500,775 | B2 | 8/2013 | Chomas et al. |
| 8,846,099 | B2 | 9/2014 | Nadal Ginard |
| 9,345,857 | B2 | 5/2016 | Dwan'isa et al. |
| 9,468,739 | B2 | 10/2016 | Sutherland et al. |
| 2001/0036451 | A1 | 11/2001 | Goupil et al. |
| 2002/0022831 | A1* | 2/2002 | O'Connor ............ A61M 25/00 606/15 |
| 2002/0143348 | A1 | 10/2002 | Wallace et al. |
| 2002/0197246 | A1 | 12/2002 | Toombs |
| 2003/0018320 | A1* | 1/2003 | Scheu ................. A61J 15/0069 604/537 |
| 2003/0045842 | A1 | 3/2003 | Kawakita et al. |
| 2003/0130682 | A1 | 7/2003 | Broome et al. |
| 2004/0006306 | A1 | 1/2004 | Evans et al. |
| 2004/0122362 | A1 | 6/2004 | Houser et al. |
| 2004/0153049 | A1 | 8/2004 | Hewitt et al. |
| 2004/0176743 | A1 | 9/2004 | Morris et al. |
| 2006/0004316 | A1 | 1/2006 | Difiore et al. |
| 2007/0073271 | A1 | 3/2007 | Brucker et al. |
| 2007/0135791 | A1 | 6/2007 | Slater et al. |
| 2007/0225636 | A1 | 9/2007 | Hahn |
| 2008/0039786 | A1 | 2/2008 | Epstein et al. |
| 2008/0172011 | A1 | 7/2008 | Heroux et al. |
| 2008/0188831 | A1 | 8/2008 | Bonnette et al. |
| 2008/0188928 | A1 | 8/2008 | Salahieh et al. |
| 2011/0082427 | A1 | 4/2011 | Golzarian et al. |
| 2011/0137399 | A1 | 6/2011 | Chomas et al. |
| 2011/0152741 | A1 | 6/2011 | Banchieri et al. |
| 2011/0182998 | A1 | 7/2011 | Reb et al. |
| 2011/0245766 | A1 | 10/2011 | Leonard et al. |
| 2011/0251629 | A1 | 10/2011 | Galdonik et al. |
| 2012/0041419 | A1 | 2/2012 | Blanchard et al. |
| 2012/0078226 | A1* | 3/2012 | Latere Dwan'isa ........................ A61M 25/007 604/117 |
| 2012/0116351 | A1 | 5/2012 | Chomas et al. |
| 2012/0245562 | A1 | 9/2012 | Bilmaier |
| 2013/0267845 | A1 | 10/2013 | Howle et al. |
| 2013/0338643 | A1 | 12/2013 | De Silva |
| 2015/0051583 | A1 | 2/2015 | Horvath et al. |
| 2015/0088090 | A1 | 3/2015 | Macy, Jr. |
| 2016/0074621 | A1 | 3/2016 | Yao et al. |
| 2017/0368306 | A1 | 12/2017 | Tal et al. |
| 2018/0049747 | A1* | 2/2018 | Tal ..................... A61L 24/0015 |
| 2018/0110533 | A1* | 4/2018 | Horak ................. A61M 25/10 |

FOREIGN PATENT DOCUMENTS

| | | |
|---|---|---|
| EP | 277738 A1 | 8/1988 |
| EP | 1857134 A1 | 11/2007 |
| EP | 2010263 A2 | 1/2009 |
| JP | H09-508557 A | 9/1997 |
| JP | H11276592 A | 10/1999 |
| JP | H11-513293 A | 11/1999 |
| JP | 2008509781 A | 3/2006 |
| JP | 2007-511290 A | 5/2007 |
| JP | 2008-086765 A | 4/2008 |
| JP | 2011178784 A | 9/2011 |
| JP | 2011529946 A | 12/2011 |
| JP | 2013-512735 A | 4/2013 |
| WO | 9604952 A1 | 2/1996 |
| WO | 1997013543 A1 | 4/1997 |
| WO | 9721455 A1 | 6/1997 |
| WO | 9833544 A1 | 8/1998 |
| WO | 0132240 A1 | 5/2001 |
| WO | 2004071495 A1 | 8/2004 |
| WO | 2005049110 A2 | 6/2005 |
| WO | 2005058198 A1 | 6/2005 |
| WO | 2007067255 A1 | 6/2007 |
| WO | 2008067362 A2 | 6/2008 |
| WO | 2009132065 A1 | 10/2009 |
| WO | 2010026578 A1 | 3/2010 |
| WO | 2010125159 A1 | 11/2010 |
| WO | 2011068924 A1 | 6/2011 |
| WO | 2011091275 A1 | 7/2011 |
| WO | 2013126456 A1 | 8/2013 |
| WO | 2013184782 A2 | 12/2013 |
| WO | 2014047179 A1 | 3/2014 |
| WO | 2015001456 A1 | 1/2015 |
| WO | 2015195625 A1 | 12/2015 |
| WO | 2015195646 A1 | 12/2015 |
| WO | 2016110824 A1 | 7/2016 |
| WO | 2016139597 A2 | 9/2016 |
| WO | 2016139606 A1 | 9/2016 |
| WO | 2017191636 A1 | 11/2017 |
| WO | 2019087191 A1 | 5/2019 |

OTHER PUBLICATIONS

PCT Written Opinion for International Application No. PCT/IL2020/050594, mailed Aug. 31, 2020, 5pp.

PCT International Preliminary Report on Patentability for International Application No. PCT/IL2020/050594, issued Nov. 16, 2021, 6pp.

PI9 007 SEQ—EURP 8 page A4 Spreads Dec. 2, 2019 EMEA; https://guerbet-interventional.com/wp-content/uploads/2019/05/2181_P_19_007_SEQURE_brochure_bd.pdf.

* cited by examiner

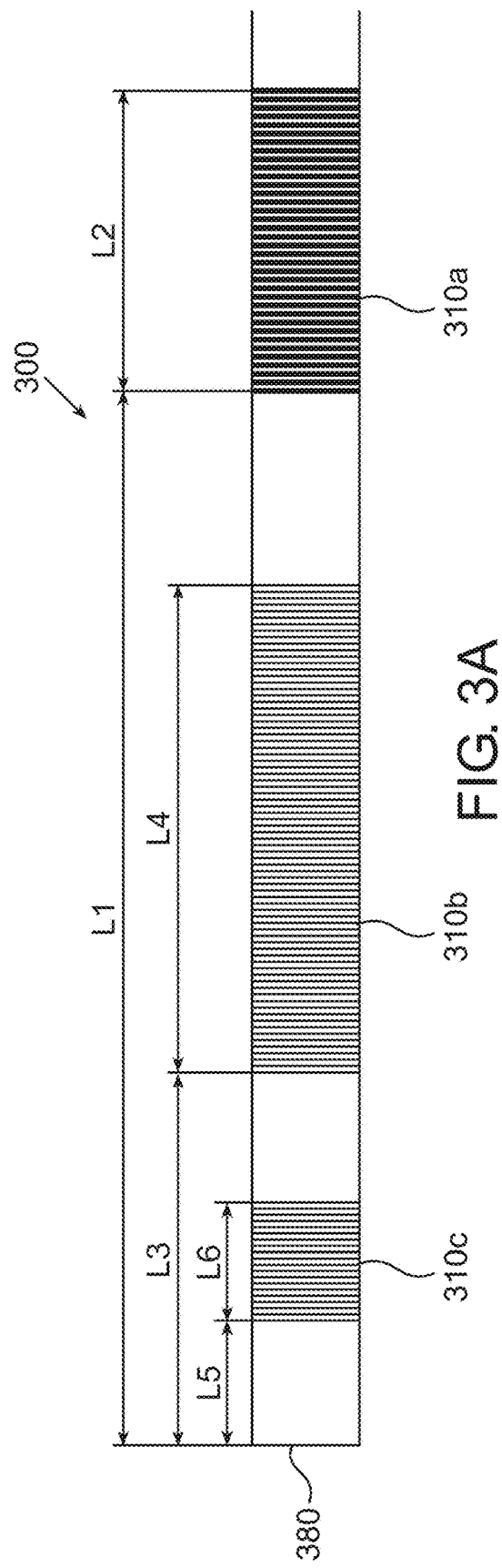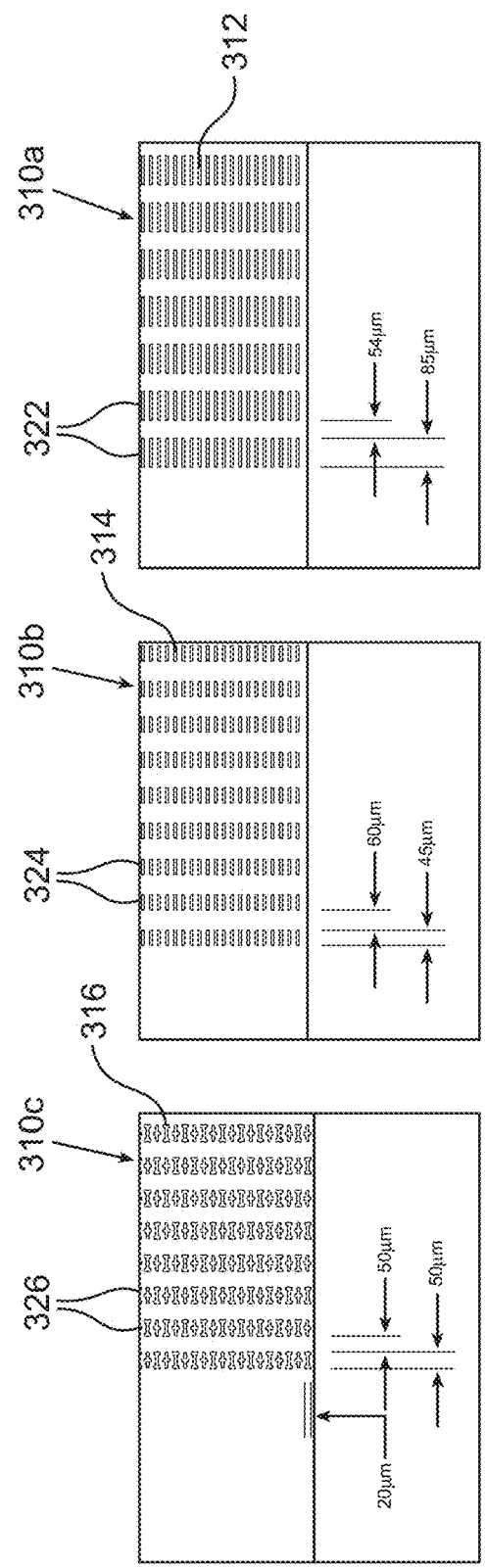

EMBOLIZATION CATHETER FOR REFLUX FREE DELIVERY OF MICROSPHERES

CROSS REFERENCE TO RELATED APPLICATIONS

This application is a National Phase of PCT Patent Application No. PCT/IL2020/050594 having International filing date of May 27, 2020, which claims the benefit of priority of U.S. Provisional Patent Application No. 62/852,009, filed May 23, 2019, the contents of which are all incorporated herein by reference in their entirety.

TECHNICAL FIELD

The present disclosure generally relates to the field of microcatheters for embolization, specifically for local embolization of blood vessels feeding a target tissue (for example, a cancerous tissue), while preventing or minimizing non-target embolization.

BACKGROUND

Transarterial embolization therapy, tumor embolization, and transcatheter arterial embolization (TAE), involve administration of embolization material directly to a target tissue (e.g. a tumor), via a microcatheter, thereby blocking or reducing the blood flow to cancer cells.

Radioembolization combines embolization and radiation therapy and has been used in particular for the treatment of liver cancers, where it has been shown to extend the lives of patients with inoperable tumors and improve their quality of life. During the procedure, tiny glass or resin beads loaded with a radioactive isotope, such as yttrium Y-90, are placed inside the blood vessels that feed the tumor, thereby delivering a high dose of radiation to the tumor, while sparing normal tissue.

A major problem associated with embolization is "non-target embolization", where the embolic material travels to blood vessels, other than those intended, thus damaging healthy tissues, resulting with unpleasant and even hazardous outcomes. Possible scenarios include gastric ulcers caused by liver embolization, as well as cases where embolic material refluxes alongside the microcatheter reaching the wall of the stomach, possibly causing ischemia and ulceration. An additional phenomenon, which is abundant especially in advanced stage liver cancer, is non-target embolization through arterioportal shunts.

Moreover, in order to reach as close as possible to the tumor, the embolization catheter must be advanced into continuously smaller and sometimes tortuous vessels, accessibility to which is difficult, if not precluded, using large and/or stiff catheters. In addition, blood vessels in the body tend to go into spasm when manipulated, causing an ineffective embolic material delivery. Accordingly, flexible micro-sized catheters are an absolute necessity.

SUMMARY OF THE INVENTION

The present disclosure relates to an embolization microcatheter for delivery of micron-sized embolization particles to a target area; the microcatheter including a skeleton, a polymeric layer intercalated into and/or on the skeleton, a distal end opening, sized and shaped to allow delivery of a suspension, the suspension including a suspension fluid and the embolization particles; and a filter having a plurality of side openings formed in the wall of the microcatheter, proximal to and at a predetermined distance from the distal end opening, e.g. 0.5 mm-10 mm, 1 mm-8 mm, 1 mm-5 mm, 2 mm-8 mm or 2 mm-5 mm from the distal end opening. Each possibility is a separate embodiment.

A major challenge associated with trans-catheter embolization is backflow of the embolization material resulting in the embolization material reaching non-target tissue (and causing damage thereto) as well as negatively affecting the delivery of the embolization material to the target tissue, thus impairing treatment effectiveness and its clinical outcome. This problem is particularly profound in radioembolization therapy, in which tiny beads, also referred to as microspheres, measuring one-third the diameter of a human hair, are utilized.

One aspect of the present disclosure provides a microcatheter configured to deliver smaller beads in a higher quantity in a low viscosity liquid. The filter of the herein-disclosed microcatheter, includes tiny openings, optionally in the form of axial slits, in an amount (typically more than 100) allowing sufficient outflow of fluid to generate a fluid barrier that prevents backflow of particles, yet each opening being small enough to prevent passage of the embolization particles. This ensures delivery of optimal treatment doses through the end opening of the microcatheter, prevents non-target embolization and enables an essentially 'reflux free' delivery of embolization particles at much higher injection rates than those achievable using standard microcatheters. An improved treatment outcome is hence provided.

Delivery of small sized beads, such as but not limited to radioembolization beads, poses two main challenges: 1) producing tiny openings without closing them off during production (e.g. during coating); and 2) to form a sufficient amount of openings to ensure that the outflow of suspension fluid suffices to prevent backflow (which is particularly challenging due to the small sized beads being delivered in a large volume of low viscosity liquid), without compromising the structural integrity of the microcatheter. Advantageously, the herein disclosed microcatheter overcomes both these challenges and meets usability requirements (trackability, torqueability, pushability and radioopacity) as well as regulatory requirements (kink resistance and tensile force resistance), as further elaborated hereinbelow.

According to some embodiments, the filter may include one or more filter sections, such as 2, 3, 4, or more filter sections. Each possibility is a separate embodiment.

According to some embodiments, at least some of the openings of the filter, (e.g. the most distal openings) may have a discrete pattern of openings that are strategically placed on the filter to allow for an increased number of filter openings.

According to some embodiments, at least some of the openings in the filter may have a unique, irregular shape. According to some embodiments, the shape of each opening is configured to have at least a first feature that corresponds to a second mating feature of a neighboring opening, such that when the features are positioned near each other, but not touching, the contours of the features are approximately inversely reciprocated.

For example, a portion of the outer perimeter of a first opening may have a first shape, which forms a protruding feature that projects or extends outwardly and a portion of the outer perimeter of a neighboring opening may have a second shape that forms an indented feature, such as a cavity or groove, wherein the contour of the protruding feature complements the contour of the indented feature. The protruding feature of the first opening is positioned approximately to, but not in contact with the indented feature of the second opening.

In one example, the outer perimeter of the shape of the opening may include a concave portion and also a convex portion.

The discrete pattern of openings on the filter may contain openings having a same shape. Optionally, the pattern may be configured with openings each having a distinct shape out of two or more different shape options. According to some embodiments, the combined shape of the openings may be of an irregular shape.

In one aspect, the filter pattern includes two different shapes for the openings. The first opening somewhat resembles a "dog bone" shape and the second shape somewhat resembles a "bead-on-a-wire" shape. Optionally, the dog bone shape may be an hourglass shape, a dumbbell shape or a shape somewhat resembling a stretched version of the letter "H". Optionally, the "bead-on-a-wire" shape may instead be in the shape of an addition sign ("plus" sign") or the letter "t".

The distinct shape of opening is configured so as to obtain several advantages. First of all, it enables tight stacking of the openings. In addition, it was unexpectedly found the unique shape of the openings also causes beads, flowing through microcatheter, to be "caught" within openings. This in turn decreases the inner diameter of the filter section and thus increases proximal pressure. Advantageously, as a result thereof, the volume of suspension fluid flowing out through the openings of the filter sections, proximal to the most distal filter section increases and thus further concentrate the beads delivered through the end opening of the microcatheter.

According to some embodiments, the total open area of the filter is at least twice, at least 3 times or at least 4 times, at least 5 times or at least 10 times the size of the area of the distal end opening. Each possibility is a separate embodiment. According to some embodiments, this may ensure a sufficient outflow of suspension fluid through the openings of the filter to prevent backflow and to provide a concentrated delivery of the beads through the end opening.

In order to allow the physician to push the microcatheter to its target location, the majority of the microcatheter (starting at its proximal end) must be relatively rigid. The distal end of the microcatheter, including the filter must, on the other hand, be flexible in order to enable the microcatheter to take the twists and turns required during navigation through the convoluted vasculature system, without kinking and/or without harming vessel walls.

Moreover, despite its flexibility and despite the numerous openings formed in the filter, the hereindisclosed microcatheter advantageously has a small kink-free radius and a tensile force which exceeds 5 N (Newtons) and thus meets the ISO 10555 requirement.

According to some aspects, there is provided an embolization microcatheter for delivery of embolization beads to a target area, the microcatheter including: a proximal end and a distal end, the distal end comprising an end opening; and a filter located between in proximity to the distal end opening; the filter including at least 100 openings distributed circumferentially around a wall thereof.

According to some embodiments, the proximal end of the microcatheter is sized and shaped to allow delivery of a suspension flowing through the microcatheter. According to some embodiments, the suspension comprises suspension fluid and the embolization beads. According to some embodiments, the filter is configured to allow outflow of the suspension fluid, while preventing outflow of the embolization beads.

According to some embodiments, the side-openings are sub-side openings. According to some embodiments, the sub-side openings may be formed by a plurality of incisions made in the polymeric layer, while leaving the skeleton intact (also referred to herein as "selective cutting". According to some embodiments, the incisions may include 40-70 elongated slits having a width of 5-15 microns or 5-10 microns and a length of 5 mm-15 mm or 5 mm-10 mm.

According to some embodiments, the at least 100 openings distributed in at least 5 discrete annular patterns. According to some embodiments, each annular pattern comprises at least 10 openings.

According to some embodiments, the length of the filter is defined by the distance between the distal edge of the distal most annular ring to the proximal edge of the proximal most annular ring. According to some embodiments, the total area of the filter refers to the area of the part of the microcatheter extending between the distal edge of the distal most annular ring to the proximal edge of the proximal most annular ring.

According to some embodiments, the filter comprises at least 10% open area, i.e. the openings formed in the wall constitute at least 10% of total area of the filter. According to some embodiments, the total open area of the filter is at least 5 times larger than an area of the distal end opening. According to some embodiments, the total open area of the filter is at least 3.0 $mm^2$ in size.

According to some embodiments, the at least 100 openings are sized and shaped to allow a flow of the embolization beads downstream the filter at a volume flow rate which allows delivery of essentially all particles in the suspension through the distal end opening, while preventing their backflow.

According to some embodiments, the embolization microcatheter has a tensile strength of at least 5N.

According to some embodiments, the at least 100 openings are axially distributed.

According to some embodiments, the embolization microcatheter includes a skeleton formed of braided or coiled wires; and a polymeric layer intercalated into and/or overlaying the skeleton. According to some embodiments, the skeleton has a thickness of 20-60 microns or 30-50 microns. As a non-limiting example, the skeleton may have a thickness of about 37 microns. According to some embodiments, the microcatheter further includes a hydrophilic coating overlaying the outer surface of the microcatheter. According to some embodiments, the at least 100 openings are formed through the outer surface and the hydrophilic coating. According to some embodiments, the microcatheter further includes an inner layer lining the inner surface of the microcatheter. According to some embodiments, the inner coating includes or is made of polytetrafluoroethylene (PTFE). According to some embodiments, the filter is devoid of the inner layer.

According to some embodiments, the openings may be conical. According to some embodiments, the openings may have a smaller cross section at the inner surface of the microcatheter than at the outer surface of the microcatheter. According to some embodiments, the width of each of the at least 100 openings is in the range of about 5-20 microns, 5-15 microns, or 5-10 microns, as measured on the inner surface of the microcatheter. Each possibility is a separate embodiment. According to some embodiments, the length of each of the at least 100 openings is in the range of about 30-60 microns, as measured on the inner surface of the microcatheter. According to some embodiments, the length of each of the plurality openings/incisions is in the range of about 5 mm-15 mm or 5 mm-10 mm, as measured on the inner surface of the microcatheter. Each possibility is a separate embodiment.

According to some embodiments, the at least 100 openings may be formed by virtue of forming a plurality of incisions (also referred to herein as side openings) in the polymeric layer, while leaving the skeleton intact, such that the resulting number of side openings (also referred to herein "sub-side openings) is greater than the number of incisions made in the polymeric layer. According to some embodiments, the resulting number of (sub)-side-openings is at least twice the number of side openings made in the polymeric layer. According to some embodiments, the resulting number of (sub)-side-openings is at least four times the number of side openings made in the polymeric layer. According to some embodiments, the resulting number of (sub)-side-openings is at least 10 times the number of side openings made in the polymeric layer. According to some embodiments, the resulting number of (sub)-side-openings is at least 50 times the number of side openings made in the polymeric layer. According to some embodiments, the resulting number of (sub)-side-openings is at least 100 times the number of side openings made in the polymeric layer.

According to some embodiments, the filter includes at least 200 openings. According to some embodiments, the filter includes at least 500 openings. According to some embodiments, the filter includes at least 1,000 openings. According to some embodiments, the filter includes at least 2,000 openings. According to some embodiments, the filter includes at least 4,000 openings. According to some embodiments, the filter includes at least 5,000 openings.

According to some embodiments, the at least 100 openings are essentially bone shaped or bead-on-string shaped.

According to some embodiments, the microcatheter includes at least two longitudinally spaced-a-part filter sections. According to some embodiments, the microcatheter includes a first distal most filter section comprising at least 500 openings, a second middle filter section comprising at least 2000 openings and a third proximal most filter section comprising at least 1000 openings. According to some embodiments, the first, second and third filter sections are spaced apart by 1-5 mm. According to some embodiments, the second filter section is longer than the first and third filter sections. According to some embodiments, the length of the openings of the third filter section is larger than a length of the openings of the first and second filter sections. According to some embodiments, the shape of the openings in the first filter section is different from the shape of the openings in the second and third filter sections.

According to some aspects, there is provided an embolization microcatheter for delivery of embolization beads to a target area, the microcatheter including a proximal end and a distal end, the distal end comprising an end opening; and a filter located between in proximity to the distal end opening; the filter including a plurality of openings distributed circumferentially/annularly around a wall thereof, wherein each of the plurality of openings is essentially bone shaped or bead-on-string shaped.

According to some embodiments, the proximal end is sized and shaped to allow delivery of a suspension flowing through the microcatheter. According to some embodiments, the suspension comprises suspension fluid and the embolization beads. According to some embodiments, the filter is configured to allow outflow of the suspension fluid, while preventing outflow of the embolization beads According to some embodiments, the filter comprises at least 10% open area, i.e. the openings formed in the wall constitute at least 10% of total area of the filter. According to some embodiments, the total open area of the filter is at least 5 times larger than an area of the distal end opening. According to some embodiments, the total open area of the filter is at least 3.0 mm$^2$ in size.

According to some embodiments, the embolization microcatheter has a tensile strength of at least 5N.

According to some embodiments, the plurality of openings is axially distributed.

According to some embodiments, the embolization microcatheter includes a skeleton formed of braided or coiled wires; and a polymeric layer intercalated into and/or overlaying the skeleton. According to some embodiments, the skeleton has a thickness of 20-60 microns or 30-50 microns. As a non-limiting example, the skeleton may have a thickness of about 37 microns. According to some embodiments, the microcatheter further includes a hydrophilic coating overlaying the outer surface of the microcatheter. According to some embodiments, the at least 100 openings are formed through the surface and the hydrophilic coating.

According to some embodiments, the microcatheter further includes an inner liner lining the inner surface of the microcatheter. According to some embodiments, the inner coating includes or is made of polytetrafluoroethylene (PTFE). According to some embodiments, the filter is devoid of the inner liner. According to some embodiments, the part of the microcatheter extending between the proximal end of the filter and the distal end opening is devoid of the inner liner.

According to some embodiments, the openings may be conical. According to some embodiments, the openings may have a smaller cross section at the inner surface of the microcatheter than at the outer surface of the microcatheter. According to some embodiments, the width of each of the plurality openings is in the range of about 5-20 microns, 5-15 microns, or 5-10 microns, as measured on the inner surface of the microcatheter. Each possibility is a separate embodiment. According to some embodiments, the length of each of the plurality openings is in the range of about 30-60 microns, as measured on the inner surface of the microcatheter. According to some embodiments, the length of each of the plurality openings/incisions is in the range of about 5 mm-15 mm or 5 mm-10 mm, as measured on the inner surface of the microcatheter. Each possibility is a separate embodiment.

According to some embodiments, the filter comprises at least 200 openings. According to some embodiments, the filter comprises at least 500 openings. According to some embodiments, the filter comprises at least 1,000 openings.

According to some embodiments, the microcatheter includes at least two longitudinally spaced-a-part filter sections. According to some embodiments, microcatheter includes a first distal most filter section including at least 500 openings, a second middle filter section including at least 2000 openings and a third proximal most filter section including at least 1000 openings.

According to some embodiments, the first, second and third filter sections are spaced apart by 1-5 mm. According to some embodiments, the second filter section is longer than the first and third filter sections. According to some embodiments, the length of the openings of the third filter section is larger than a length of the openings of the first and second filter sections. According to some embodiments, the shape of the openings in the first filter section is different from the shape of the openings in the second and third filter sections.

According to some aspects, there is provided an embolization microcatheter for delivery of embolization beads to a target area, the microcatheter including a proximal end and a distal end, the distal end comprising an end opening sized and shaped to allow delivery of a suspension flowing through the microcatheter; and a filter located between in proximity to the distal end opening; the filter including a plurality of openings distributed circumferentially around a wall thereof, wherein the width of each of the plurality openings is in the range of about 5-20 microns, as measured at the inner surface of the microcatheter.

According to some embodiments, the proximal end is sized and shaped to allow delivery of a suspension flowing through the microcatheter. According to some embodiments, the suspension comprises suspension fluid and the embolization beads. According to some embodiments, the filter is configured to allow outflow of the suspension fluid while preventing outflow of the embolization beads.

According to some embodiments, the filter comprises at least 10% open area, i.e. the openings formed in the wall constitute at least 10% of total area of the filter. According to some embodiments, the total open area of the filter is at least 5 times larger than an area of the distal end opening. According to some embodiments, the total open area of the filter is at least 3.0 mm$^2$ in size.

According to some embodiments, the embolization microcatheter has a tensile strength of at least 5N.

According to some embodiments, the plurality of openings is axially distributed.

According to some embodiments, the embolization microcatheter includes a skeleton formed of braided or coiled wires; and a polymeric layer intercalated into and/or overlaying the skeleton. According to some embodiments, the skeleton has a thickness of 20-60 microns or 30-50 microns. As a non-limiting example, the skeleton may have a thickness of about 37 microns. According to some embodiments, the microcatheter further includes a hydrophilic coating overlaying the outer surface of the microcatheter, and wherein the at least 100 openings are formed through the hydrophilic coating.

According to some embodiments, the microcatheter further includes an inner liner lining the inner surface of the microcatheter. According to some embodiments, the inner liner includes or is made of polytetrafluoroethylene (PTFE). According to some embodiments, the filter is devoid of the inner liner.

According to some embodiments, the filter includes at least 200 openings. According to some embodiments, the filter includes at least 500 openings. According to some embodiments, the filter includes at least 1,000 openings.

According to some embodiments, the microcatheter includes at least two longitudinally spaced-a-part filter sections. According to some embodiments, the microcatheter includes a first distal most filter section including at least 500 openings, a second middle filter section including at least 2000 openings and a third proximal most filter section including at least 1000 openings. According to some embodiments, the first, second and third filter sections are spaced apart by 1-5 mm. According to some embodiments, the second filter section is longer than the first and third filter sections. According to some embodiments, the length of the openings of the third filter section is larger than the length of the openings of the first and second filter sections. According to some embodiments, the shape of the openings in the first filter section is different from the shape of the openings in the second and third filter sections.

According to some aspects, there is provided an embolization microcatheter for delivery of embolization beads to a target area, the microcatheter including a proximal end and a distal end, the distal end comprising an end opening sized and shaped to allow delivery of a suspension flowing through the microcatheter; and a filter located between in proximity to the distal end opening; the filter including a plurality of openings distributed circumferentially around a wall thereof, wherein the total open area of the filter is at least 5 times larger than an area of the distal end opening.

According to some embodiments, the proximal end is sized and shaped to allow delivery of a suspension flowing through the microcatheter. According to some embodiments, the suspension comprises suspension fluid and the embolization beads. According to some embodiments, the filter is configured to allow outflow of the suspension fluid while preventing outflow of the embolization beads.

According to some embodiments, the total open area of the filter is at least 10 times larger than an area of the distal end opening. According to some embodiments, the total open area of the filter is at least 3.0 mm$^2$ in size.

According to some embodiments, the embolization microcatheter has a tensile strength of at least 5N.

According to some embodiments, the plurality of openings are axial openings.

According to some embodiments, the embolization microcatheter includes a skeleton formed of braided or coiled wires; and a polymeric layer intercalated into and/or overlaying the skeleton. According to some embodiments, the skeleton has a thickness of 20-60 microns or 30-50 microns. As a non-limiting example, the skeleton may have a thickness of about 37 microns. According to some embodiments, the microcatheter further includes a hydrophilic coating overlaying the outer surface of the microcatheter, wherein the at least 100 openings are formed through the outer surface and the hydrophilic coating.

According to some embodiments, the microcatheter further includes an inner liner lining the inner surface of the microcatheter. According to some embodiments, the inner liner includes or is made of polytetrafluoroethylene (PTFE). According to some embodiments, the filter is devoid of the inner liner.

According to some embodiments, the filter includes at least 200 openings. According to some embodiments, the filter includes at least 500 openings. According to some embodiments, the filter includes at least 1,000 openings.

According to some embodiments, the microcatheter includes at least two longitudinally spaced-a-part filter sections.

According to some aspects, there is provided an embolization microcatheter for delivery of embolization beads to a target area, the microcatheter including a proximal end and a distal end, the distal end including an end opening sized and shaped to allow delivery of a suspension flowing through the microcatheter; and at filter located in proximity to the distal end opening; the filter including a plurality of irregularly distributed openings formed circumferentially around a wall thereof.

According to some embodiments, the proximal end is sized and shaped to allow delivery of a suspension flowing through the microcatheter. According to some embodiments, the suspension comprises suspension fluid and the embolization beads. According to some embodiments, the filter is configured to allow outflow of the suspension fluid while preventing outflow of the embolization beads.

According to some embodiments, the total open area of the filter section is at least 3 times larger than an area of the distal end opening. According to some embodiments, the total open area of the filter section is at least 5 times larger than an area of the distal end opening. According to some embodiments, the total open area of the filter is at least 10 times larger than an area of the distal end opening. According to some embodiments, the total open area of the filter is at least 3.0 mm$^2$ in size.

According to some embodiments, the embolization microcatheter has a tensile strength of at least 5N.

According to some embodiments, the plurality of openings are axial openings.

According to some embodiments, the embolization microcatheter includes a skeleton formed of braided or coiled wires; and a polymeric layer intercalated into and/or overlaying the skeleton. According to some embodiments, the skeleton has a thickness of 20-60 microns or 30-50 microns. As a non-limiting example, the skeleton may have a thickness of about 37 microns. According to some embodiments, the microcatheter further includes a hydrophilic coating overlaying the outer surface of the microcatheter, wherein the at least 100 openings are formed through the outer surface and the hydrophilic coating.

According to some embodiments, the microcatheter further includes an inner liner lining the inner surface of the microcatheter. According to some embodiments, the inner liner includes or is made of polytetrafluoroethylene (PTFE). According to some embodiments, the filter is devoid of the inner liner.

According to some embodiments, the filter includes at least 200 openings. According to some embodiments, the filter includes at least 500 openings. According to some embodiments, the filter includes at least 1,000 openings.

According to some embodiments, the microcatheter includes at least two longitudinally spaced-a-part filter sections.

Certain embodiments of the present disclosure may include some, all, or none of the above characteristics. One or more technical advantages may be readily apparent to those skilled in the art from the figures, descriptions and claims included herein. Moreover, while specific characteristics have been enumerated above, various embodiments may include all, some or none of the enumerated characteristics.

In addition to the exemplary aspects and embodiments described above, further aspects and embodiments will be further expanded upon in the figures and the following detailed descriptions.

BRIEF DESCRIPTION OF THE FIGURES

Examples illustrative of embodiments are described below with reference to figures attached hereto. Identical structures elements or parts that appear in more than one figure are generally labeled with the same number in all the figures in which they appear. Alternatively, elements or parts that appear in more than one figure may be labeled with different numbers in the different figures in which they appear. The dimensions of the components and features in the figures were chosen for convenience and clarity of presentation and are not necessarily shown to scale. The figures are listed below:

FIG. 3A schematically illustrates a spread-out view of a 2.7 French microcatheter having a filter with three filter sections including openings distributed circumferentially around a wall thereof; according to some embodiment;

FIG. 3B shows an enlarged view of the distal most filter section of the microcatheter of FIG. 3A;

FIG. 3C shows an enlarged view of the middle filter section of the microcatheter of FIG. 3A;

FIG. 3D shows an enlarged view of the proximal most filter section of the microcatheter of FIG. 3A;

DETAILED DESCRIPTION OF THE INVENTION

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure.

Figure 1A:
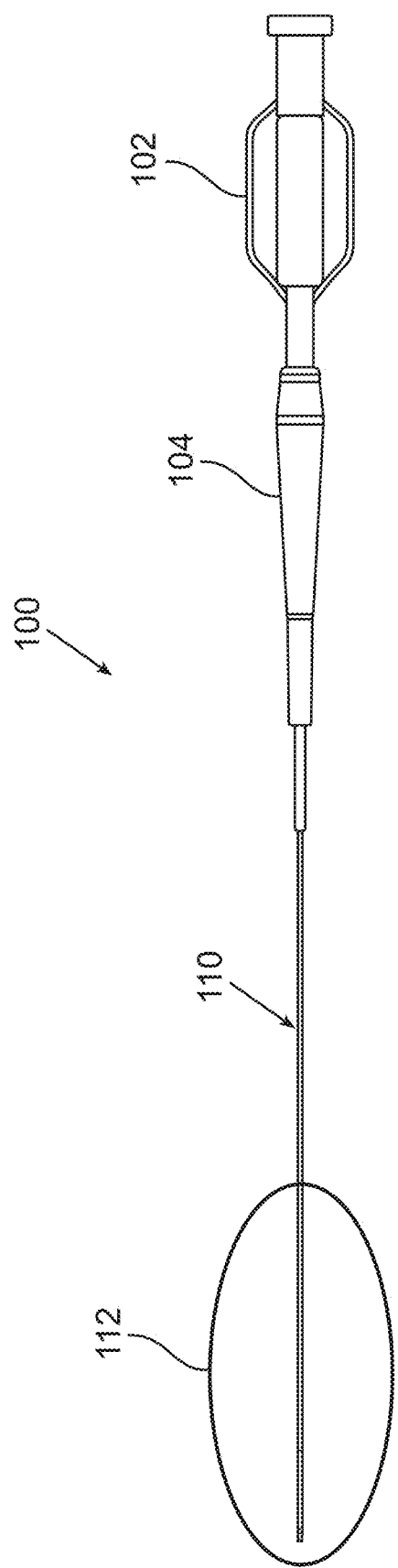
FIG. 1A schematically illustrates a perspective view of a microcatheter including a filter, according to some embodiments.
Figure 1B:
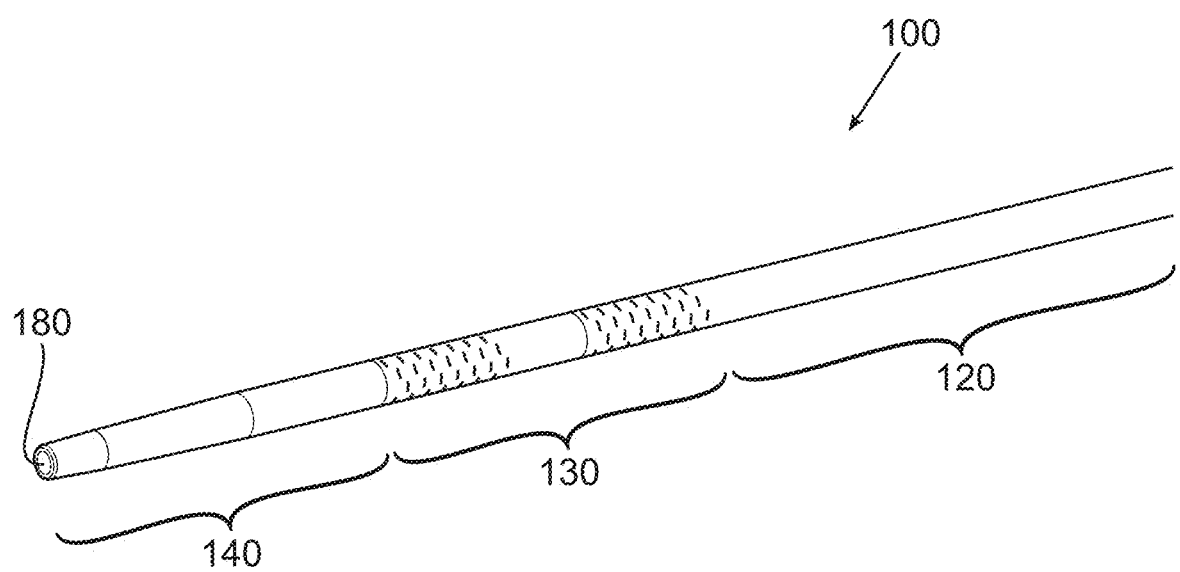
FIG. 1B schematically illustrates a perspective view of a distal end of the microcatheter of FIG. 1A, according to some embodiments.

Reference is now made to FIG. 1A and FIG. 1B, which schematically illustrate an embolization microcatheter 100 and an enlarged view of its distal end 112, according to some aspects of the present disclosure. The embolization microcatheter includes an elongated body 110 having an outer diameter of 1 mm or less. Elongated body 110 includes a navigation section 120, a filter 130, and a delivery section 140, the latter terminating in an end opening 180. According to some embodiments, the polymeric layer forming the wall of filter 130 and/or delivery section 140 may be more flexible than the polymeric layer forming the wall of navigation section 120.

The navigation section 120 is configured for navigating the microcatheter. As used herein, the term "navigation section" may refer to the part of the microcatheter required for pushing and/or steering the microcatheter through the vasculature to the target region. The navigation section 120 extends over the majority of the length of elongated body 110. The navigation section 120 may be relatively rigid as compared to the relatively flexible filter 130 and delivery section 140 of the microcatheter. According to some embodiments, the navigation section 120 enables efficient delivery of the microcatheter 100 to a target region (not shown) e.g. by using a pusher mechanism (not shown) of a handle. Microcatheter 100 further includes a hub 102 which is molded on or otherwise attached to the proximal end of navigation section 120. The hub is configured to allow access to the lumen of microcatheter 300 for a variety of functions, such as the injection of fluids or drugs, or the introduction of guidewires. Hub 102 includes a strain relief 104, preferably mechanically coupled to hub 102. Strain relief 104 may be made of a polymeric material and may, as illustrated, be tapered at its distal end. Strain relief 104 and be configured to provide structural support to navigation section 120, to prevent it from kinking.

As used herein, the term "filter", refers to the part of microcatheter configured to allow lateral outflow of a suspension fluid while blocking passage of beads/particles (i.e. embolization particles) flowing therein. The filter is formed at a pre-determined distance from distal outlet (also referred to herein as the "distal end opening"), e.g. 0.5 mm-10 mm, 1 mm-8 mm, 1 mm-5 mm, 2 mm-8 mm or 2 mm-5 mm from the distal outlet. Each possibility is a separate embodiment. According to some embodiments, 20-75% of the fluid injected into the catheter exits through the filter. The filter 130 is here illustrated as including two filter regions/sections, however other configurations of the filter section(s) are also possible, as for example illustrated in FIG. 3A-FIG. 3D (which include 3 filter sections) and FIG. 6, FIG. 7 and FIG. 9 (which include a single filter section).

According to some embodiments, the total area of the filter refers to the area of the part of the microcatheter extending between the distal edge of the distal most annular ring to the proximal edge of the proximal most annular ring.

According to some embodiments, the filter 130 may be integrally formed with the delivery section 140 and the navigation section 120. According to some embodiments, the part of the filter 130, including the plurality of openings, may extend along a length of 0.3 mm-20 mm, such as 1 mm-10 mm, 1 mm-5 mm, 1.5 mm-5 mm, 2 mm-5 mm or any other in-between suitable length. Each possibility is a separate embodiment.

As used herein, the term "delivery section" may refer to the distal end of the microcatheter extending between the distal end of filter 130 and distal end opening 180. The delivery section 140 may be configured to restrict and/or impede flow and/or to modify the flow of the suspension so as to decrease the horizontal velocity of the particles along the longitudinal axis of the microcatheter.

According to some embodiments, the delivery section 140 may have a tapered inner surface. According to some embodiments, the delivery section may have tapered inner and outer surfaces. According to some embodiments, the delivery section may have an essentially non-tapered inner surface. Each possibility is a separate embodiment. According to some embodiments, the length of the delivery section may be in the range of 2-15 mm, 3-12 m, 5-10 mm, 5-8 mm or any other suitable length within the range of 2-20 mm. Each possibility is a separate embodiment. According to some embodiments, the length of the delivery section may be approximately 7 mm. As used herein, the term "approximately" with regards to the length of the delivery section may refer to +/−10%, or +/−5%, or +−/2%. Each possibility is a separate embodiment.

As used herein, the term "distal end opening" refers to the end opening of the microcatheter leading into the lumen thereof. According to some embodiments, the distal end opening defines the termination of the microcatheter at the distal end thereof. According to some embodiments, the distal end opening may have an inner diameter essentially equal to the inner diameter of the microcatheter lumen. According to some embodiments, the distal end opening may have an inner diameter, which is smaller than the inner diameter of the microcatheter lumen leading to a narrowing of the lumen toward the end thereof.

According to some embodiments, the filter 130 of the microcatheter includes three sections, which may be formed integrally, as one piece. Such configuration advantageously eases the production of the microcatheter and may ensure that no attachment and/or assembly, which typically constitutes a weak link and, is required and as such, may result in detachment/dismantling of the microcatheter. However, the sections can also be formed as separate elements co-assembled to form the microcatheter.

According to some embodiments, the navigation section 120 of the microcatheter may be made from or include a thermoplastic elastomer, such as, but not limited to, thermoplastic polyurethane (such as Pellethane™ TPU by The Lubrizol Corporation, OH, USA) or polyether block amide (such as Pebax™ TPE by Arkema Group, Colombes, France), Nylon, Polyimide, Silicone or any combination thereof. Each possibility is a separate embodiment.

According to some embodiments, the wall of the filter and/or of the delivery section of the microcatheter may be made from thermoplastic elastomer, such as, but not limited to, thermoplastic polyurethane (such as Pellethane™ TPU by The Lubrizol Corporation, OH, USA) or polyether block amide (such as Pebax™ TPE by Arkema Group, Colombes, France), Nylon, Polyimide, Silicone or any combination thereof. Each possibility is a separate embodiment.

Figure 2:
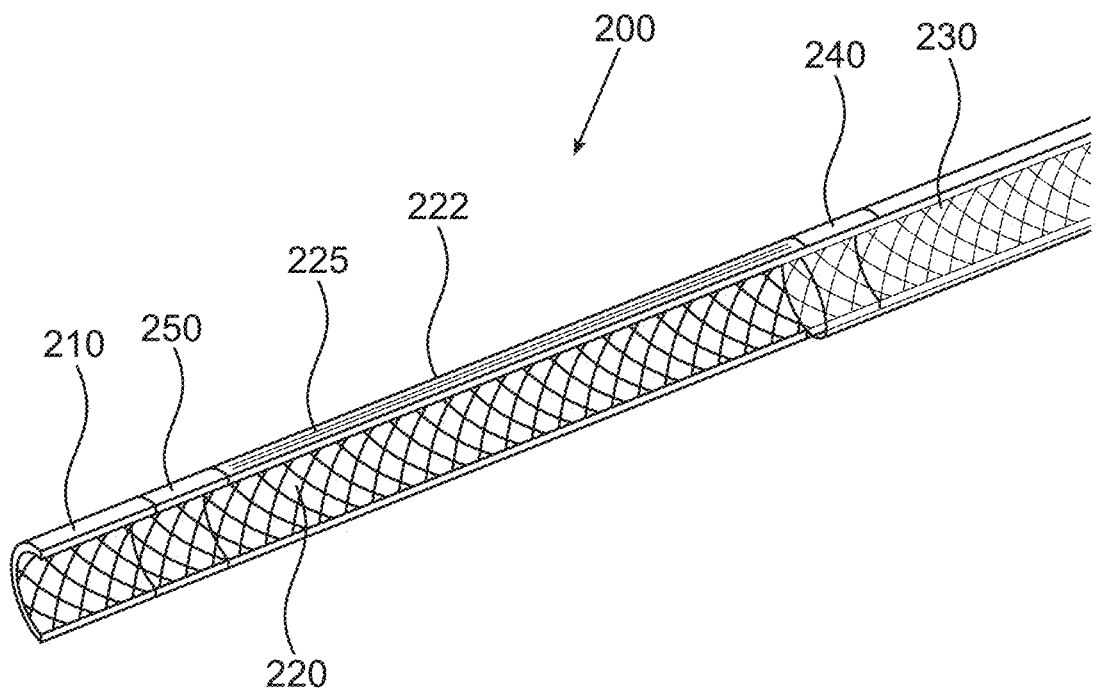
FIG. 2 schematically illustrates a perspective, cutaway view of the distal end of a microcatheter, according to some embodiments.

Reference is now made to FIG. 2, which schematically illustrates a perspective, cutaway view of the distal end of a microcatheter 200, according to some embodiments. Microcatheter 200 includes an outer polymeric layer 222 embedded into which is a skeleton 220. According to some embodiments, skeleton 220 may be braided. Microcatheter 200 further includes an inner liner 230. According to some embodiments, inner liner 230 may include or be made of polytetrafluoroethylene (PTFE).

According to some embodiments, and as shown in FIG. 2, inner liner 230 extends only along a part of the microcatheter 200 e.g. only the part of microcatheter 200 proximal to its filter (here shown with elongated incisions 225 formed in the polymeric layer but not in skeleton 220. Advantageously, the absence of line 230 may obviate the need to penetrate inner liner 230 when forming the incisions 225 of the filter or the need to remove inner liner material from the incisions 225, if applied after the formation thereof.

According to some embodiments, microcatheter 200 may include a first marker 240 at the proximal end of the filter and a second marker 250 at the distal end of the filter. According to some embodiments, first marker 240 may be a polymeric marker. According to some embodiments, second marker 250 may be a metallic marker. According to some embodiments, such distribution of the markers, on the one hand ensure that microcatheter 200 withstands the force of at least 5 N and, on the other hand, prevent unraveling of the braid. Advantageously, due to the difference in radio-opaqueness, the markers may serve as indications of the proximal/distal end of the filter, when traveling through curved vasculature.

Reference is now made to FIG. 3A to FIG. 3D and FIG. 4A to FIG. 4C, which schematically illustrate a spread-out view and enlarged views (FIG. 3B to FIG. 3D) of a microcatheter 300 in which the filter includes three filter sections 310a-310c, according to some embodiments, each of filter sections 310a-310c including a plurality if side openings 312, 314 and 316, arranged in annular rings 322, 324 and 326, respectively. Microcatheter 300 is here shown to be a 2.7 French microcatheter; however, those skilled in the art will appreciate the microcatheter may be of another suitable size, for example, but not limited to 2.4 French or 2.8 French. Microcatheter 300 is suitable for controlled delivery of small (15-60 microns) embolization beads (also referred to as "microspheres"). In one example, the small embolization beads may be in the size range of 15-60 microns. Microcatheter 300 is not limited to radioembolization beads but may also be utilized for the delivery of larger beads. According to some embodiments, microcatheter 300 is suitable for use in the treatment of arteriovenous malformations and hypervascular tumors, such as but not limited to uterine fibroids (UFE) and hepatoma, embolization of prostatic arteries (PAE) and for symptomatic benign prostatic hyperplasia (BPH).

Filter section 310a is the most proximal of filter sections 310a-310c and is positioned approximately L1 mm (wherein L1 is in the range of 10 mm-30 mm) proximally to distal end opening 380. In one example, filter section 310a is positioned about 17 mm proximally to the distal end opening 380. The number of openings (collectively referred to as 312, also referred to herein as slits, included in filter section 310a may be at least 200, or at least 500, or at least 1,000, or at least 2,000, or more. By way of example, FIG. 3D, illustrates the filter section 310a as having about 2,592 openings (36 rows×72 columns). Those skilled in the art will appreciate the number of openings is not limited to this value. According to some embodiments, filter section 310a may have a total length L2 of 3 mm to 8 mm. By way of example, filter section 310a may have a length of about 5 mm.

Figure 4A:
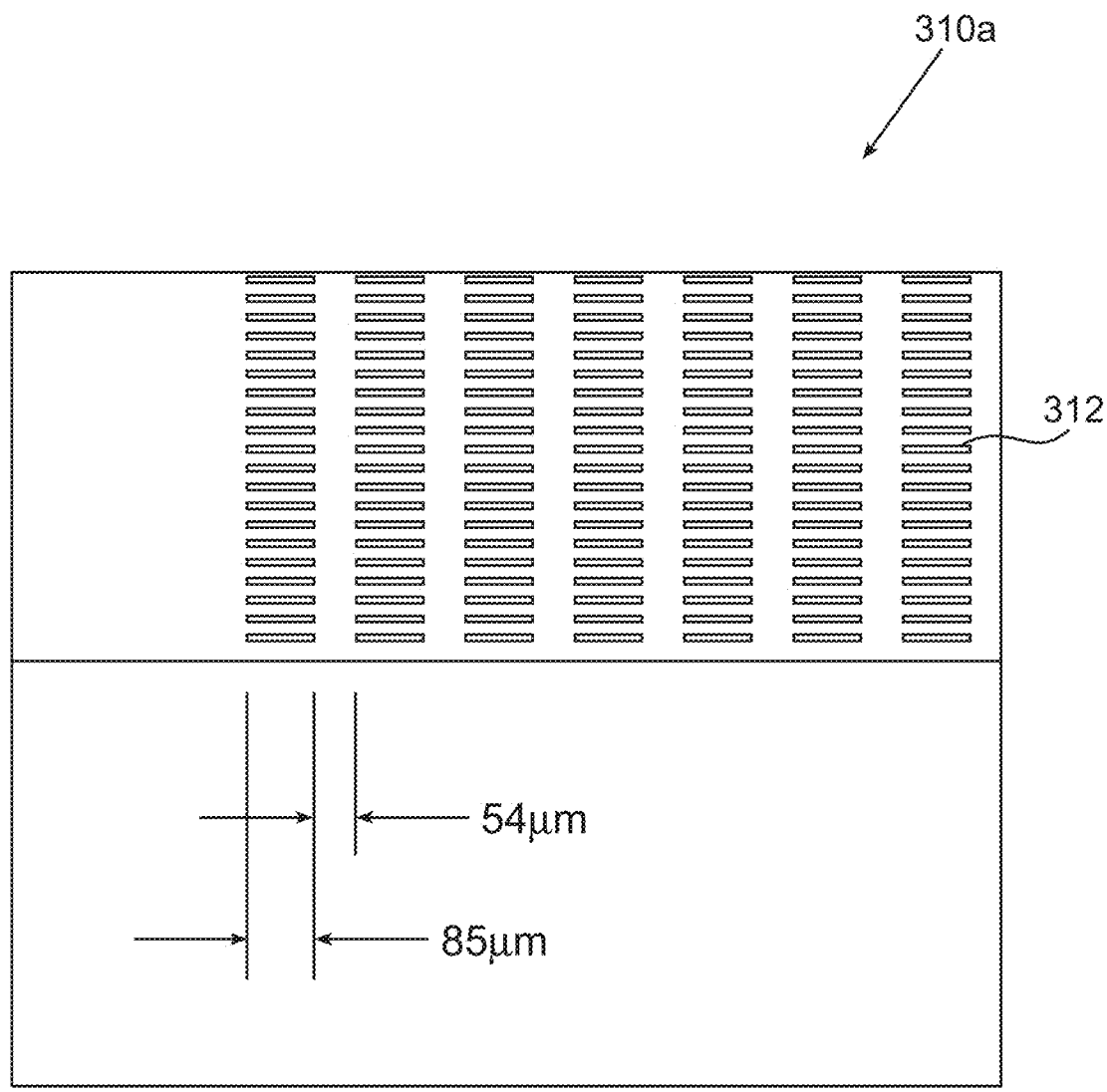
FIG. 4A shows a further enlarged view of the proximal most filter section of the microcatheter of FIG. 3A and its openings.
Figure 4B:
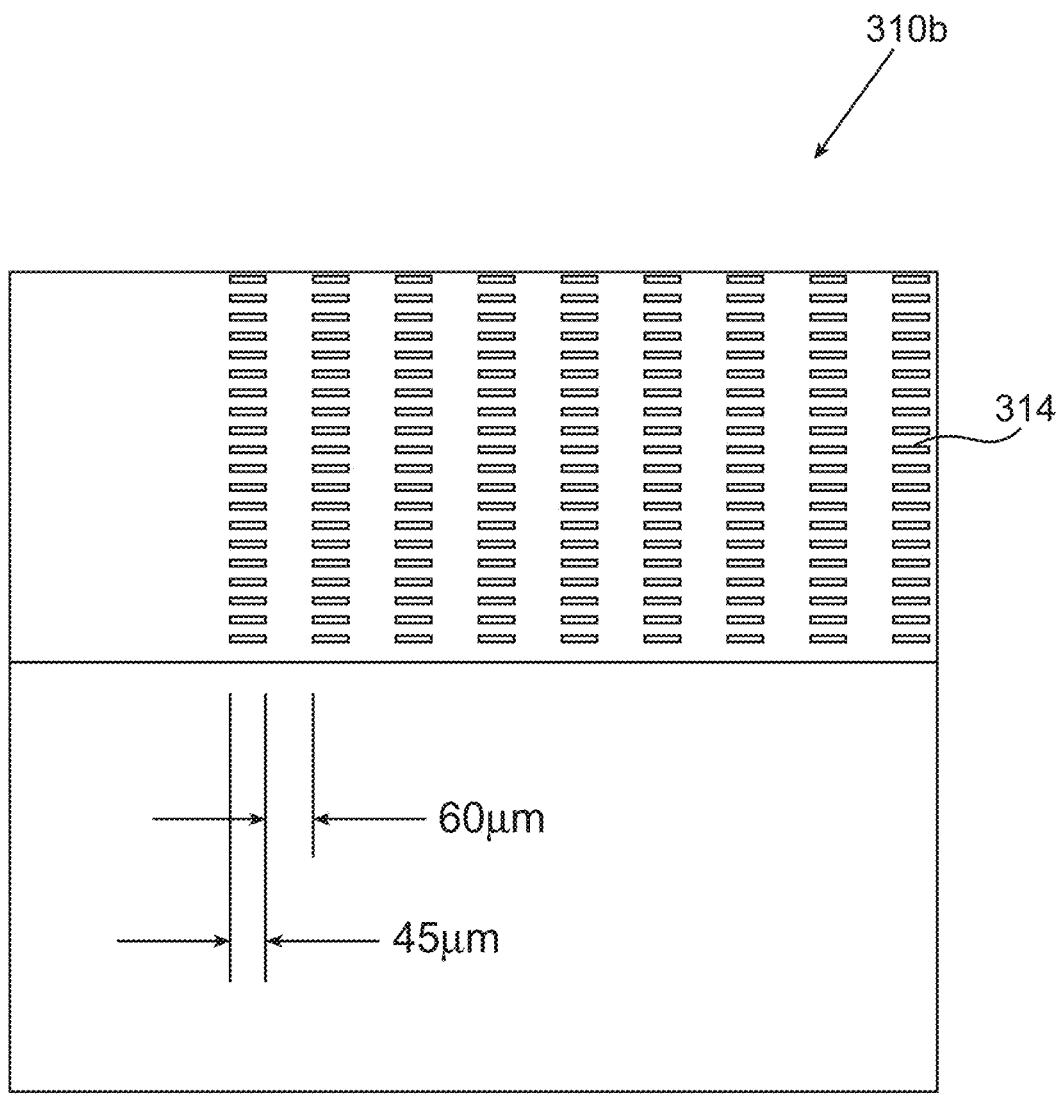
FIG. 4B shows a further enlarged view of the middle filter section of the microcatheter of FIG. 3A and its openings.

As best seen in FIG. 4A, openings 312 are relatively long (longer than openings 314 and 316 of filter sections 310b and 310c respectively), and may have a length, for example of 60 microns-100 microns, as measured on the inner surface of the microcatheter. By way of example, FIG. 3A, illustrates the openings 312 as having a length of 85 microns, as measured on the inner surface of the microcatheter. Openings 312 are narrow and may have a width of 5 microns-15 microns. By way of example, and as illustrated in FIG. 4B, openings 312 may have a width of 8 microns. Each annular ring of openings is spaced apart from its neighboring ring of openings by approximately 40 microns-80 microns. For example, in FIG. 3D, each annular ring 322 is spaced apart from its neighboring annular ring by about 54 microns. The size and shape of openings 312 serve to ensure that even the smallest embolization beads are prevented from flowing out through openings 312 even when microcatheter 300 is being bent, while outflow of suspension fluid, in which the embolization beads are suspended, is relatively unhindered. According to some embodiments, slits 312 may be separated from its neighboring slit in a same annular ring by approximately 4-10 degrees. According to one embodiment, slits 312 may be separated from its neighboring slit in a same ring by approximately 6 degrees.

Filter section 310b is the middle filter section located between filter section 310a and 310c and is located L3 (approximately 3 mm-10 mm) proximally to distal end opening 380. According to one embodiment, filter section 310b is positioned about 6 mm proximally to distal end opening 380. The number of openings included in filter section 310b may be at least 200, or at least 500, or at least 1,000, or at least 2,000 or, at least 5,000 or more. By way of example, FIG. 3C illustrates middle filter section 310b as having about 5,472 openings (76 rows×72 columns—collectively referred to as 314). Those skilled in the art will appreciate that the number of openings 314 are not limited to this value. As best seen in FIG. 4B, openings 314 are relatively short (shorter than openings 312 and 316 of filter sections 310a and 310c respectively). The openings 314 have an approximate length in the range of 30 microns-50 microns, as measured on the inner surface of the microcatheter. By way of example, openings 314 illustrated in FIG. 4B may have a length of about 45 microns, as measured on the inner surface of the microcatheter. Openings 314 may be narrow e.g. having a width of 5 microns-15 microns, as measured on the inner surface of the microcatheter. By way of example, openings 314 illustrated in FIG. 3C may have a width of 8 microns. Each annular ring of openings is spaced apart from its neighboring ring of openings by 40 microns-80 microns. By way of example, as illustrated in FIG. 3C, each of annular rings 324 may be spaced apart by approximately 60 microns. The size and shape of openings 314 serve to ensure that even the smallest embolization beads are prevented from flowing out through openings 314 even when microcatheter 300 is being bent, while outflow of suspension fluid, in which the embolization beads are suspended, is allowed, albeit with higher flow restriction than the outflow of fluid through openings 312. The smaller size of openings 314 as compared to openings 312 accommodates the lower flow rate downstream of filter section 310a caused by outflow of fluid through openings 312.

According to some embodiments, filter section 310b may have a total length L4 of 5 mm to 15 mm or 5 mm to 12 mm. By way of example, filter section 310b may have a length of about 8 mm.

According to some embodiments, slits 314 may be separated from its neighboring slit in a same annular ring by approximately 4-10 degrees. According to one embodiment, slits 314 may be separated from its neighboring slit in a same annular ring by approximately 6 degrees.

Filter section 310c is the most distal of filter sections 310a-310c and is located L5 (about 1-3 mm) from distal end opening 380 of microcatheter 300. According to one embodiment, filter section 310c is positioned about 2 mm proximally to distal end opening 380. The number of openings included in filter section 310c may be at least 100, or at least 200, or at least 500 or at least 1,000 openings or more. By way of example, FIG. 3B illustrates filter section 310c having about 1,200 openings, collectively referred to as 316 (20 rows×60), distributed circumferentially around the wall of microcatheter 300. Those skilled in the art will appreciate that the number of openings 316 are not limited to this value. Openings 316 are configured to prevent outflow of the embolization beads, while allowing outflow of the suspension fluid in which the embolization beads are suspended.

According to some embodiments, filter section 310c may have a total length L6 of 1 mm to 5 mm or 1.5 mm to 2.5 mm. By way of example, filter section 310b may have a length of about 2 mm.

Each annular ring of openings is spaced apart from its neighboring ring of openings by 40 microns-80 microns. By way of example, as illustrated in FIG. 3B each of annular rings 326 may be spaced apart by approximately 50 microns.

According to some embodiments, slits 316 may be separated from its neighboring slit in a same column by approximately 3-10 degrees. According to one embodiment, slits 316 may be separated from its neighboring slit in a same column by approximately 5 degrees.

Figure 4C:
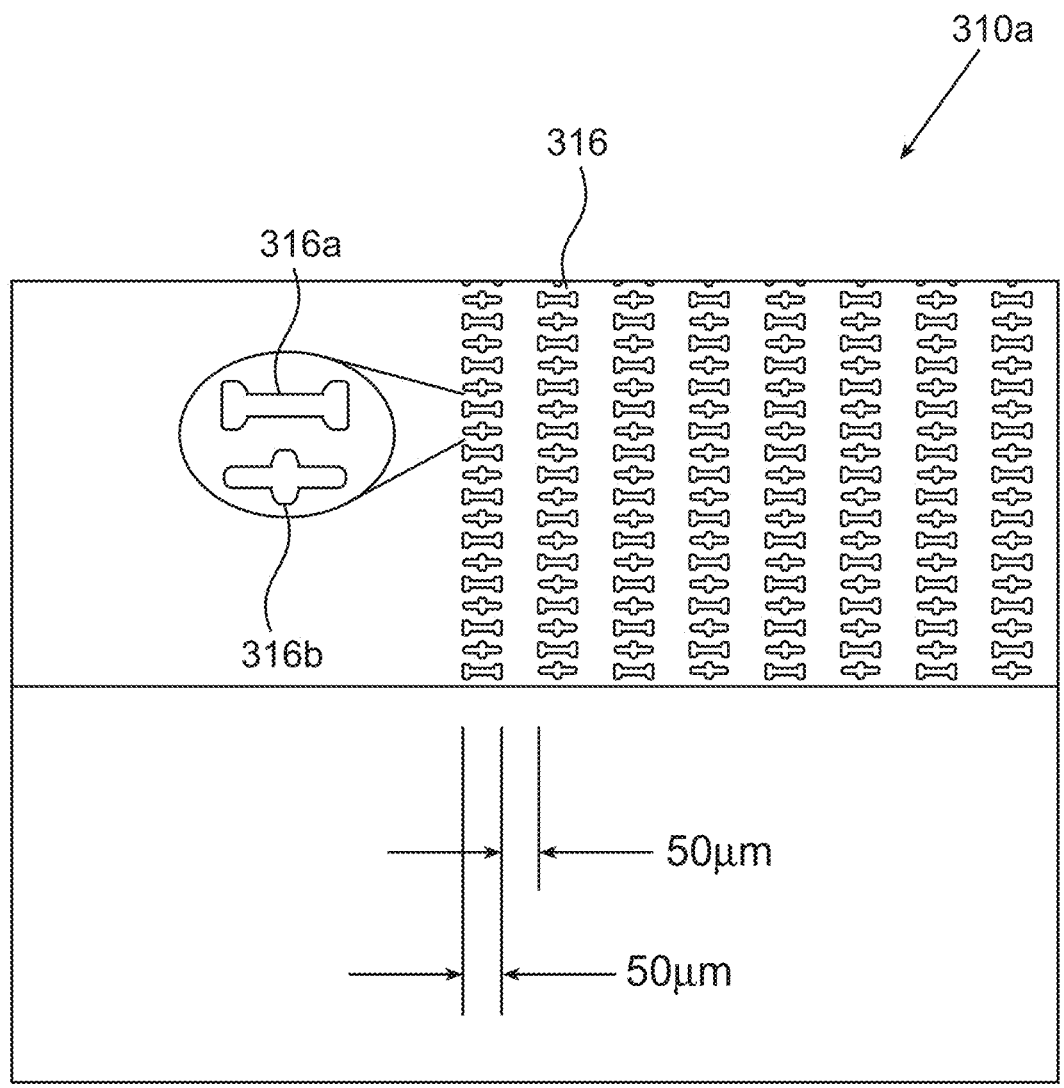
FIG. 4C shows a further enlarged view of the distal most filter section of the microcatheter of FIG. 3A and its openings.

According to some embodiments, openings 316 may be irregularly shaped. By way of example and as illustrated in FIG. 4C, openings 116 may have either a "dog bone shaped" 316a or a "bead-on-a-string shaped" 316b, as best seen in FIG. 4C. The irregular shape of openings 316 cause beads flowing through microcatheter 300 to be caught within openings 316, which in turn decreases the inner diameter of filter section 310c and thus increases proximal pressure. Advantageously, as a result thereof, the volume of suspension fluid injected through openings 312 and 314 of filter sections 310a and 310b, proximal to filter section 310a increases further concentrating the beads delivered through end opening 380. Openings 316 are preferably arranged such that each opening is neighbored by an opening having a different, but complementary shape, as shown in FIG. 3B. This arrangement ensures an optimal stacking of the openings enabling a large number of openings being formed in each circumferential column despite their irregular shape.

Figures 5A, 5B:
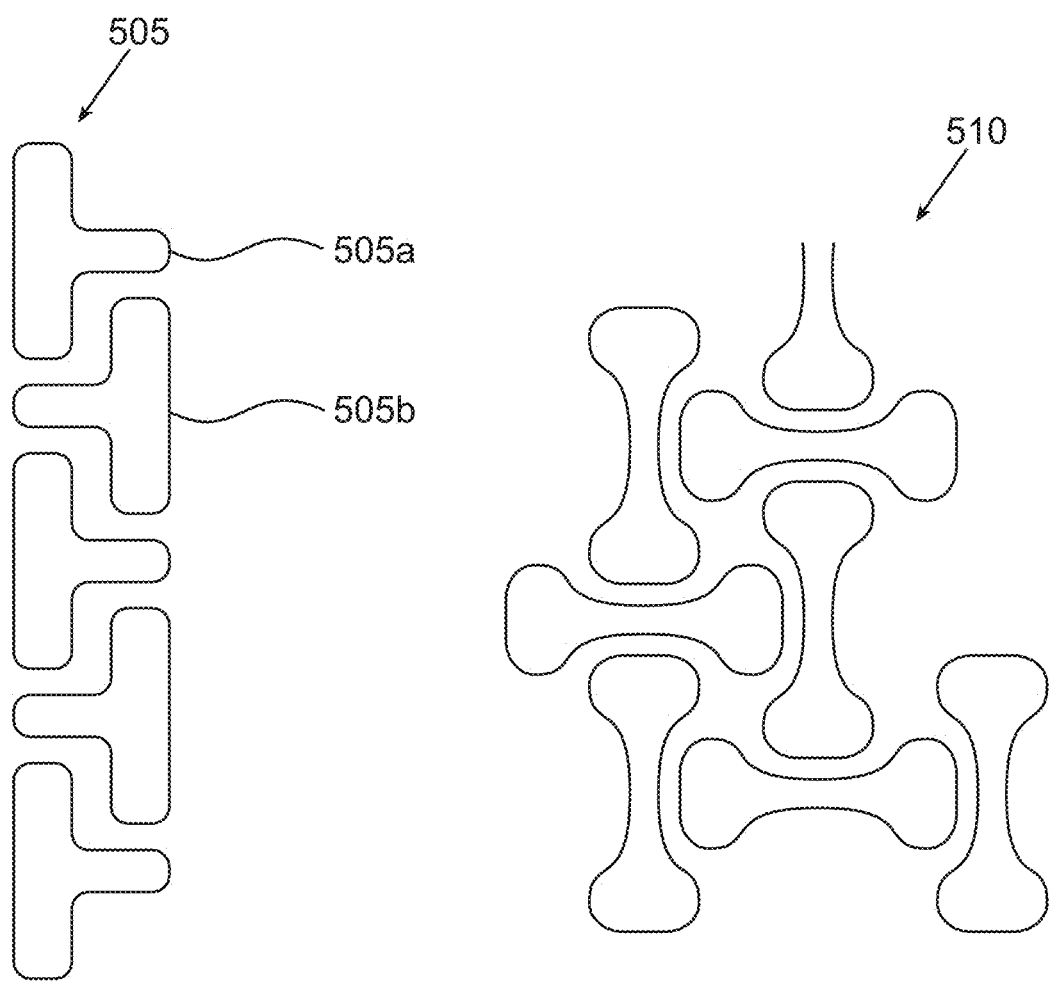
FIG. 5A shows an optional shape of at least some of the openings of a filter, according to some embodiments.
FIG. 5B shows an optional distribution of at least some of the openings of a filter, according to some embodiments.

It is understood that other "irregularly shaped openings such as openings 505 illustrated in FIG. 5A may also be envisaged. According to some embodiments, the openings include a protruding feature that projects or extends outwardly and a portion of the outer perimeter of a neighboring opening may have a second shape that includes an indented feature, such as a cavity or groove, wherein the contour of the protruding feature complements the contour of the indented feature. For example, the protruding feature of the first opening 505a is positioned approximately to, but not in contact with the indented feature of the second opening 505b.

It is also understood that other that the distribution of the openings may be irregular, as for example illustrated by the distribution of openings 510 in FIG. 5B.

Figure 5C:
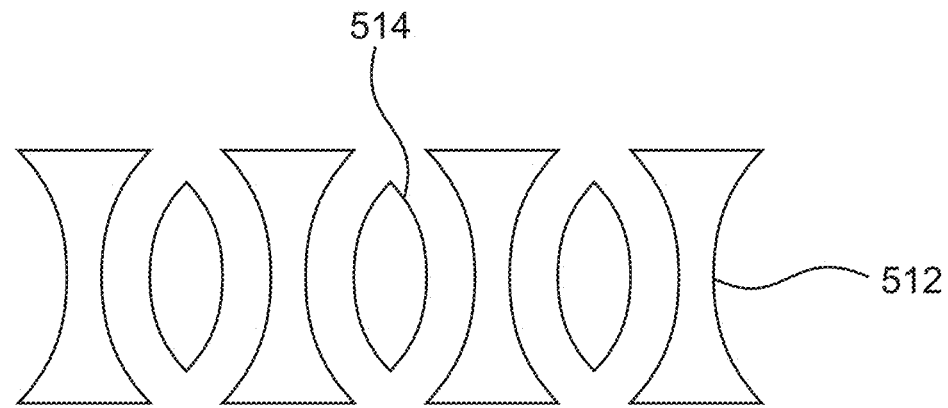
FIG. 5C illustrates an optional filter pattern which utilizes at least different shapes.

In another aspect, the pattern of openings on the filter, includes at least two different shapes of openings as illustrated in FIG. 5C. In this example, the shape 512 includes two concave features that complement the convex features of shape 514. Those skilled in the art will appreciate other shapes, including irregular shapes, may be utilized for the shape of the openings.

According to some embodiments, openings 505, 510, 512 and 512 may have a smaller cross section at the inner surface of the microcatheter than at the outer surface of the microcatheter.

According to some embodiments, at least 5% of each of the filter sections is open area. Optionally, the open area may be at least 10%, or at least 15% or at least 20% of each of filter sections 310a-310c. Each possibility is a separate embodiment. According to some embodiments, the total open area of each of filter sections 310a-310c is at least 2 times, at least 3 times, at least 5 times, at least 8 times, or at least 10 times larger than an area of distal end opening 380. This ensures a sufficient outflow of suspension fluid through openings 312, 314 and 316 to prevent backflow and to provide a concentrated delivery of the beads through end opening 380. Each possibility is a separate embodiment. According to some embodiments, the total open area of filter sections 310a-310c is at least 1.5 mm$^2$, at least 2.0 mm$^2$, at least 3.0 mm$^2$, at least 4.0 mm$^2$ or at least 5.0 mm$^2$ in size. Each possibility is a separate embodiment.

According to some embodiments, the open area of each openings of filter section 310a may be about 0.0004-0.001 mm$^2$ or about 0.0006-0.0007 mm$^2$. By way of example, the open area of each openings of filter section 310a (best seen in FIG. 4A) is 8 μm*85 μm, which is 0.00068 mm$^2$. Those skilled in the art will appreciate that the open area of each opening in filter section 310a is not limited to this specific value.

According to some embodiments, the total open area of filter section 310a may be about 0.7-2.5 mm$^2$, about 1.0-2.0 mm$^2$, or about 1.5-1.8 mm$^2$. By way of example, the total open area of filter section 310a is 2592 (number of openings in filter section 310a)×0.00068 mm$^2$ (open area of each openings in filter section 310a) which is 1.76 mm$^2$. Those skilled in the art will appreciate that the total open area of filter section 310a is not limited to this specific value.

According to some embodiments, the open area of each opening of filter section 310b may be about 0.0001-0.0005 mm$^2$ or about 0.0002-0.0004 mm$^2$. By way of example, the open area of each openings of filter section 310b (best seen in FIG. 4B) is 8 μm×45 μm, which is 0.00036 mm$^2$. Those skilled in the art will appreciate that the open area of each openings in filter section 310b is not limited to this specific value.

According to some embodiments, the total open area of filter section 310b may be about 1.5-3.0 mm$^2$, about 1.5-2.5 mm$^2$, or about 1.7-2.0 mm$^2$. By way of example, the total open area of filter section 310b is 5472 (number of openings in filter section 310b)×0.00036 mm$^2$ (open area of each opening in filter section 310b) which is 1.97 mm$^2$. Those skilled in the art will appreciate that the total open area of filter section 310b is not limited to this specific value.

According to some embodiments, the open area of each "dog bone" shaped opening 316a of filter section 310c may be about 0.0003-0.0008 mm$^2$ or about 0.0005-0.0007 mm$^2$. By way of example, the open area of each "dog bone" shaped opening of filter section 310c (best seen in FIG. 4C) is 0.00059 mm$^2$. Those skilled in the art will appreciate that the open area of each "dog bone" shaped opening in filter section 310c is not limited to this specific value.

According to some embodiments, the open area of each "beads-on-a-string" shaped opening 316b of filter section 310c may be about 0.0003-0.0008 mm$^2$ or about 0.0005-0.0007 mm$^2$. By way of example, the open area of each "beads-on-a-string" shaped opening of filter section 310c (best seen in FIG. 4C) is 0.00050 mm². Those skilled in the art will appreciate that the open area of each "dog bone" shaped opening in filter section 310c is not limited to this specific value.

According to some embodiments, the total open area of the "dog bone" shaped openings 316a of filter section 310c may be about 0.1-1.0 mm², about 0.2-0.7 mm², or about 0.3-0.5 mm². By way of example, the total open area of "dog bone" shaped openings 316a of filter section is 600 (number of "dog bone" shaped openings in filter section 310c)× 0.00059 mm² (open area of each opening in filter section 310c) which is 0.35 mm². Those skilled in the art will appreciate that the total open area of the "dog bone" shaped openings 316a of filter section 310c is not limited to this specific value.

According to some embodiments, the total open area of the "beads-on-a-string" shaped openings 316b of filter section 310c may be about 0.1-1.0 mm², about 0.2-0.7 mm², or about 0.3-0.5 mm². By way of example, the total open area of "dog bone" shaped openings 316b of filter section is 600 (number of "beads-on-a-string" shaped openings in filter section 310c)×0.00050 mm² (open area of each opening in filter section 310c) which is 0.30 mm². Those skilled in the art will appreciate that the total open area of the "beads-on-a-string" shaped openings 316b of filter section 310c is not limited to this specific value.

According to some embodiments, microcatheter 300 has a tensile strength of at least at least 3N, at least 4N, or at least 5N. Each possibility is a separate embodiment.

According to some embodiments, openings 312, 314 and/or 316 are axially distributed.

According to some embodiments, the wall of microcatheter 300 includes/is made of a skeleton (not shown) formed of braided or coiled wires; and a polymeric layer (not shown) intercalated into and/or overlaying the skeleton. According to some embodiments, openings 312, 314 and/or 316 are formed such that the braid/coil remains intact (not cut). This advantageously ensures the structural integrity (at least about 5N tension force, kink resistance, flexibility and torqueability) of microcatheter 300.

According to some embodiments, the polymeric layer may include or be made of a thermoplastic elastomer, such as, but not limited to, thermoplastic polyurethane (such as Pellethane™ TPU by The Lubrizol Corporation, OH, USA) or polyether block amide (such as Pebax™ TPE by Arkema Group, Colombes, France), Nylon, Polyimide, Silicone or any combination thereof. Each possibility is a separate embodiment.

According to some embodiments, the skeleton has a thickness of 20-60 microns or 30-50 microns. As a non-limiting example, the skeleton may have a thickness of about 37 microns. According to some embodiments, the skeleton may be a tungsten braid. According to some embodiments, the braid/coil may be made of Nickel titanium (Nitinol). According to some embodiments, the braid/coil may be made from or include stainless steel, cobalt chrome, platinum iridium, nylon or any combination thereof. Each possibility is a separate embodiment. Advantageously, the such relatively thick wires enable selective cutting of the polymer of the microcatheter wall (e.g. using a femtosecond laser, with a Galvo scanning head and complementary optics, while causing minimal impact/damage to the braid.

According to some embodiments, the wall of microcatheter 300 further includes a hydrophilic liner (not shown) overlaying the polymeric layer of microcatheter 300. According to some embodiments, filter sections 310a, 310b and/or 310c may be devoid of the liner. This may advantageously help conserve the integrity of the braid during laser cutting and increase the kink resistance of the microcatheter. Alternatively, openings 312, 314 and/or 316 are formed through the polymeric layer and the hydrophilic liner.

According to some embodiments, the polymeric layer of microcatheter 300 may be made of a different polymeric material along its length. According to some embodiments, the polymeric layer of the part of microcatheter 300, which is proximal to filter section 310a, has a higher shore than the part of microcatheter 300, which is proximal to filter section 310a. According to some embodiments, the polymeric layer of the part of microcatheter 300, which is proximal to filter section 310c, has a higher shore than the part of microcatheter 300, which is distal to filter section 310c.

According to some embodiments, microcatheter 300 further includes an inner layer (also referred to herein as an inner liner) lining the inner surface of the wall of microcatheter 300. According to some embodiments, the layer may include or be made of polytetrafluoroethylene (PTFE). According to some embodiments, openings 312, 314 and/or 316 are formed through the inner layer. According to some embodiments, the inner layer extends only along part of the microcatheter 300 proximal to filter section 310a, thereby obviating the need to penetrate the inner layer when forming the openings or the need to remove inner layer material from the openings if applied after openings 312, 314 and/or 316 are formed.

Microcatheter 300 is here illustrated as having three filter sections; however, any number (e.g. 1, 2, 4, 5 or more) of filter sections may be envisaged and is thus within the scope of this disclosure. Each possibility is a separate embodiment. According to some embodiments, the filter sections may be spaced apart by 2-5 mm, here filter section 310a is spaced apart from filter section 310b by about 3 mm, and filter section 310b is spaced apart from filter section 310c by about 2 mm.

According to some embodiments, the filter sections may have a length of 4-10 mm. According to some embodiments, the filter sections may be of a same or different length. Here, filter section 310a has a length of about 5 mm, filter section 310b a length of about 8 mm and filter section 310c a length of about 2 mm.

According to some embodiments, microcatheter 300 may further include one or more radiopaque markers (not shown). According to some embodiments, microcatheter 300 may include a proximal marker positioned proximally to at least filter section 310c and a distal marker positioned distally to filter section 310c and in proximity filter section 310c. According to some embodiments, the proximal marker may be made from a polymeric material configured to retain the tensile strength of microcatheter 300. According to some embodiments, the distal marker may be a metallic marker, this to prevent unraveling of the braid/coil of the skeleton. Advantageously, due to the difference in radio-opaqueness, the markers may serve as indications of the proximal/distal end of the filter section, when traveling through curved vasculature.

Microcatheter 300 further includes a hub (not shown) which is molded on or otherwise attached to the proximal end of microcatheter 300. The hub is configured to allow access to the lumen of microcatheter 300 for a variety of functions, such as the injection of fluids or drugs, or the introduction of guidewires.

Figure 6:
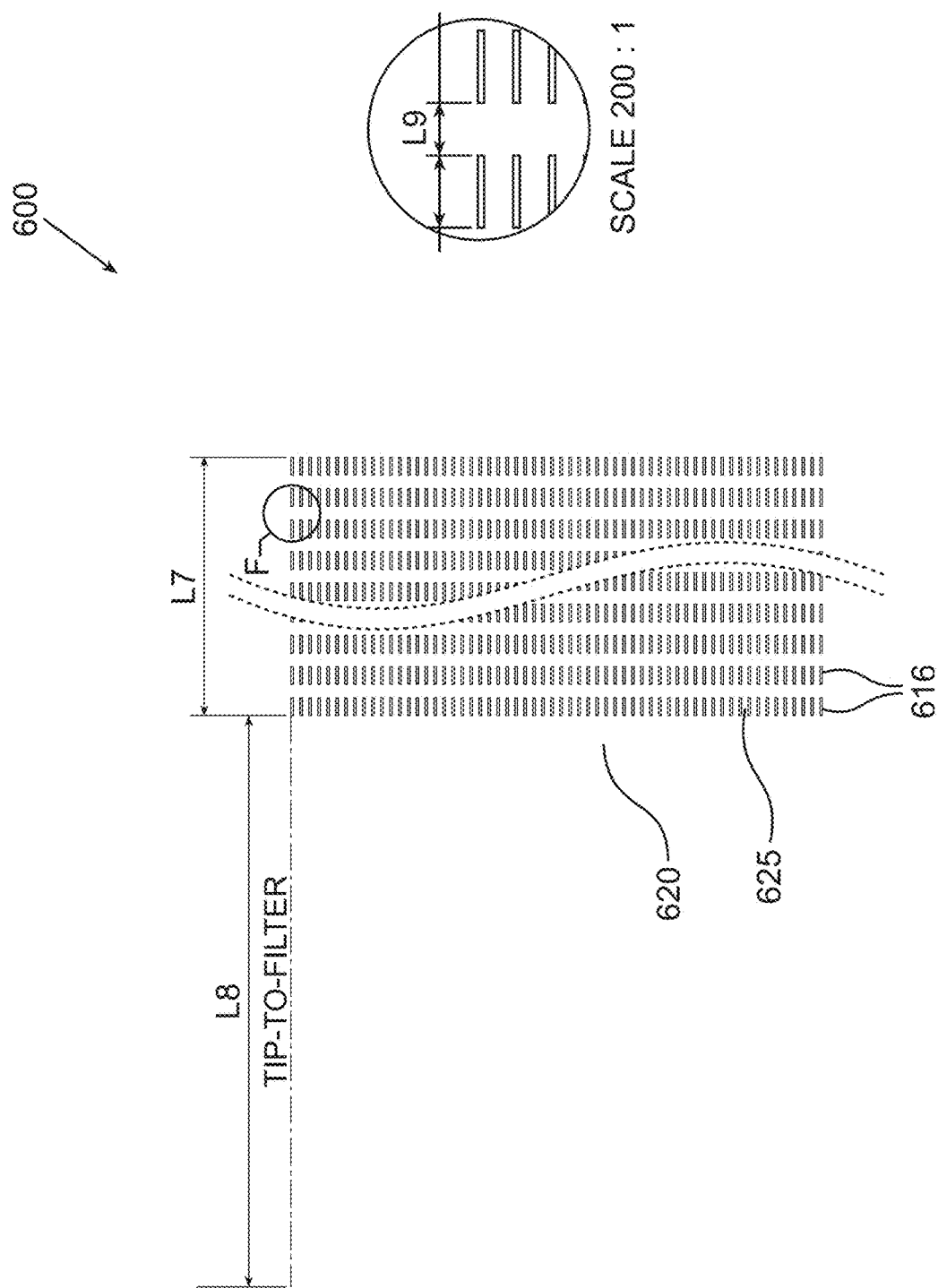
FIG. 6 schematically illustrates an optional slit pattern for an embolization microcatheter such as the embolization microcatheter of FIG. 2, according to some embodiments.

Reference is now made to FIG. 6, which schematically shows another optional structure of a filter 600 of an embolization microcatheter, such as microcatheter 200 of FIG. 2. According to some embodiments, filter 600 may include a single filter section 620 including a plurality of circumferential/annular rings (collectively referred to as 616), such as 50-200 or 75-125 rings (e.g. 116 rings), each ring comprising a plurality of side openings, collectively referred to as 625, such as 40-100, or 40-80 or 50-70 slits (e.g. 60 side openings as illustrated here). According to some embodiments, filter 620 may have a length of L7, wherein L7 is in the range of 15 mm to 25 mm, e.g. about 19 mm.

According to some embodiments, side openings 625 may be in the form of slits. According to some embodiments, each of side opening 625 may have a width of 5 microns-15 microns or 5 microns-10 microns, (e.g. 8 microns), as measured on the inner surface of the microcatheter. According to some embodiments, side openings 625 may have a length of 70-150 microns or 80-100 microns, (e.g. 95 microns), as measured on the inner surface of the microcatheter. According to some embodiments, the distal most of the rings of filter may be positioned L8 mm from the distal end opening, wherein L8 is in the range of about 1-10 mm or 2-8 mm, such as but not limited to about 3 mm. According to some embodiments, each ring may be spaced apart from a neighboring ring by a length L9, wherein L9 is in the range of 50-100 microns or 60-80 microns, e.g. 70 microns.

According to some embodiments, side openings 625 may be formed by selective cutting (e.g. selective laser cutting), that is, without cutting the wires forming skeleton 220. According to some embodiments, the polymeric layer positioned between the wires of braid skeleton 220 are penetrated when forming the slits. Advantageously, the selective cutting of the polymeric layer (leaving braid skeleton 220 essentially intact may provide subdivision of at least some of the side-openings into two or more sub-side-openings separated by the braid but not by the polymeric outer layer.

Figure 7:
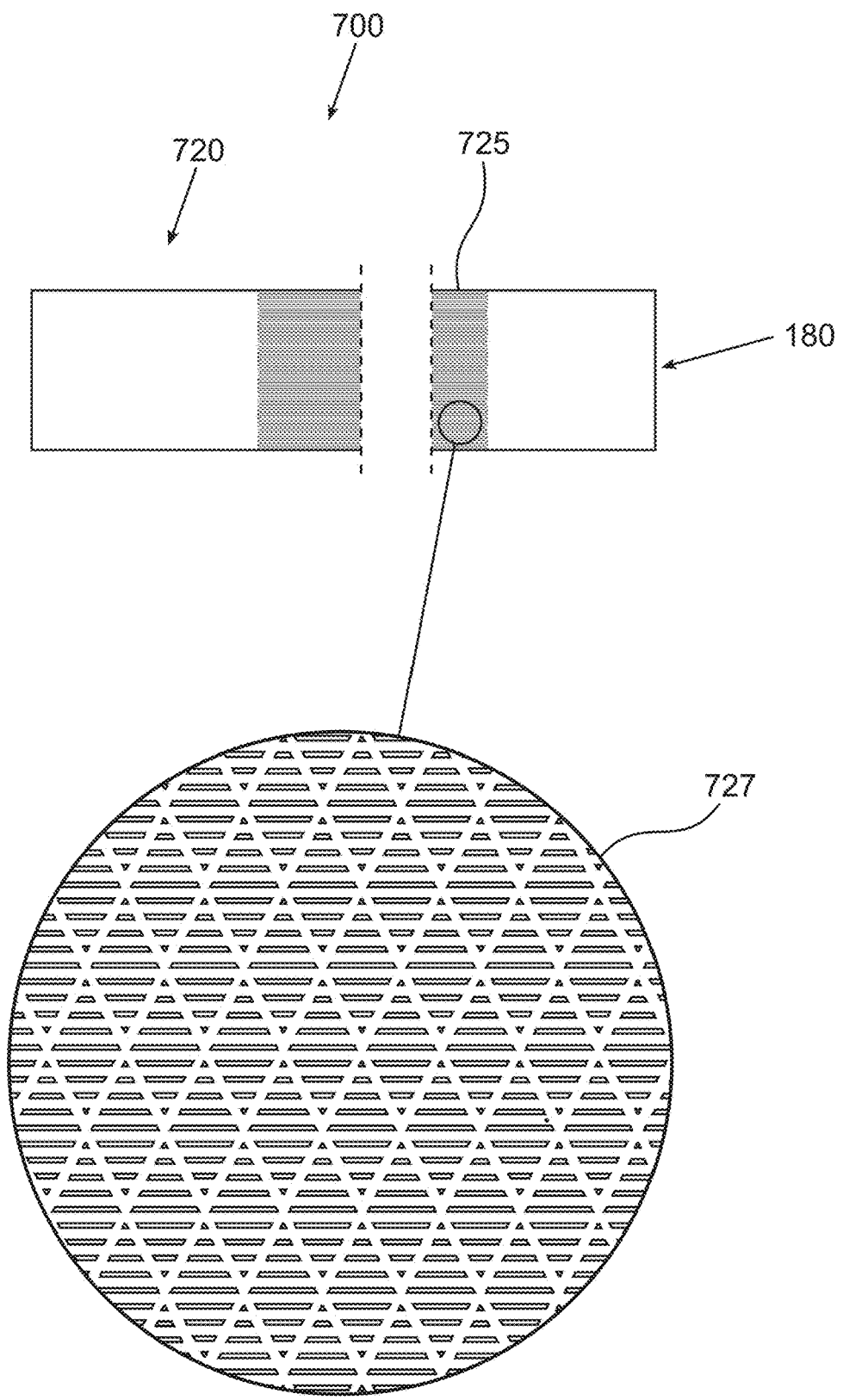
FIG. 7 schematically illustrates another optional slit pattern for an embolization microcatheter such as the embolization microcatheter of FIG. 2, according to some embodiments.

Reference is now made to FIG. 7, which schematically shows yet another optional structure of a filter 700 of an embolization microcatheter, such as microcatheter 200 of FIG. 2. According to some embodiments, filter 700 may include a single filter section 720 including a plurality of side openings, collectively referred to as side openings 725. According to some embodiments, the openings may be in the form of axial slits. According to some embodiments, the slits may be annularly distributed, (i.e. distributed circumferentially around the wall of the microcatheter). According to some embodiments, filter section 720 includes 40-100, or 40-80 or 50-70 slits (e.g. 60 side openings). According to some embodiments, each of side opening 725 may have a width of 5 microns-15 microns or 5 microns-10 microns, (e.g. 8 microns), as measured on the inner surface of the microcatheter. According to some embodiments, each of side opening 725 may have a length of 6 mm-15 mm (e.g. 7 mm), as measured on the inner surface of the microcatheter.

According to some embodiments, side openings 725 may be in the form of slits. According to some embodiments, each of side openings 725 may have a width of 5 microns-15 microns or 5 microns-10 microns (e.g. 8 microns), as measured on the inner surface of the microcatheter. According to some embodiments, each of side opening 725 may have a length of 0.75 mm to 25 mm, 1-20 mm, or 0.75-10 mm (e.g. 19 mm), as measured on the inner surface of the microcatheter. According to some embodiments, the filter 700 may be positioned about 1-10 mm or 2-8 mm, such as but not limited to about 3 mm from the distal end opening.

According to some embodiments, side openings 725 may be formed by selective cutting (e.g. selective laser cutting), that is, without cutting the wires forming skeleton 220. According to some embodiments, the polymeric layer positioned between the wires of braid skeleton 220 are penetrated when forming the slits. Advantageously, the selective cutting of the polymeric layer (leaving braid 200 essentially intact) may provide subdivision of at least some of the side-openings into a plurality of sub-side-openings 727 separated by skeleton 220, but not by the polymeric outer layer. By way of example, as illustrated in FIG. 7B approximately 60 side openings 725 formed in the polymeric layer may result in more than 2500 and even more than 3000 sub-side-openings.

According to some embodiments, the resulting number of sub-side-openings is greater than the number of side openings made in the polymeric layer. According to some embodiments, the resulting number of sub-side-openings is at least twice the number of side openings made in the polymeric layer. According to some embodiments, the resulting number of sub-side-openings is at least 4 times the number of side openings made in the polymeric layer.

Figure 8A:
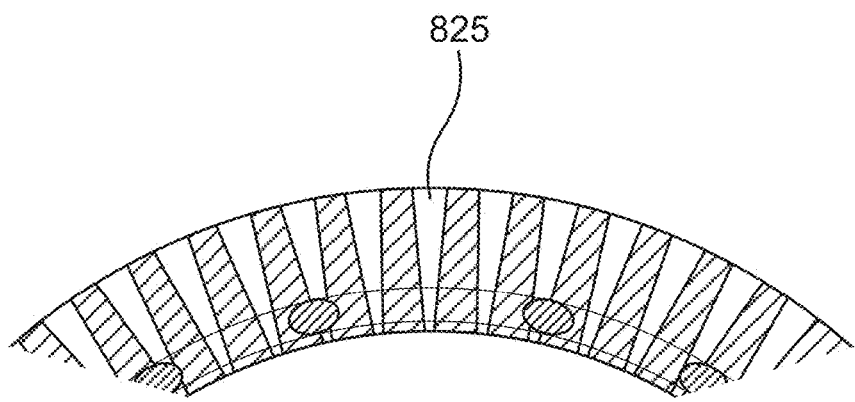
FIG. 8A schematically illustrates a frontal view of a detail of a filter of an embolization microcatheter, according to some embodiments.
Figure 8B:
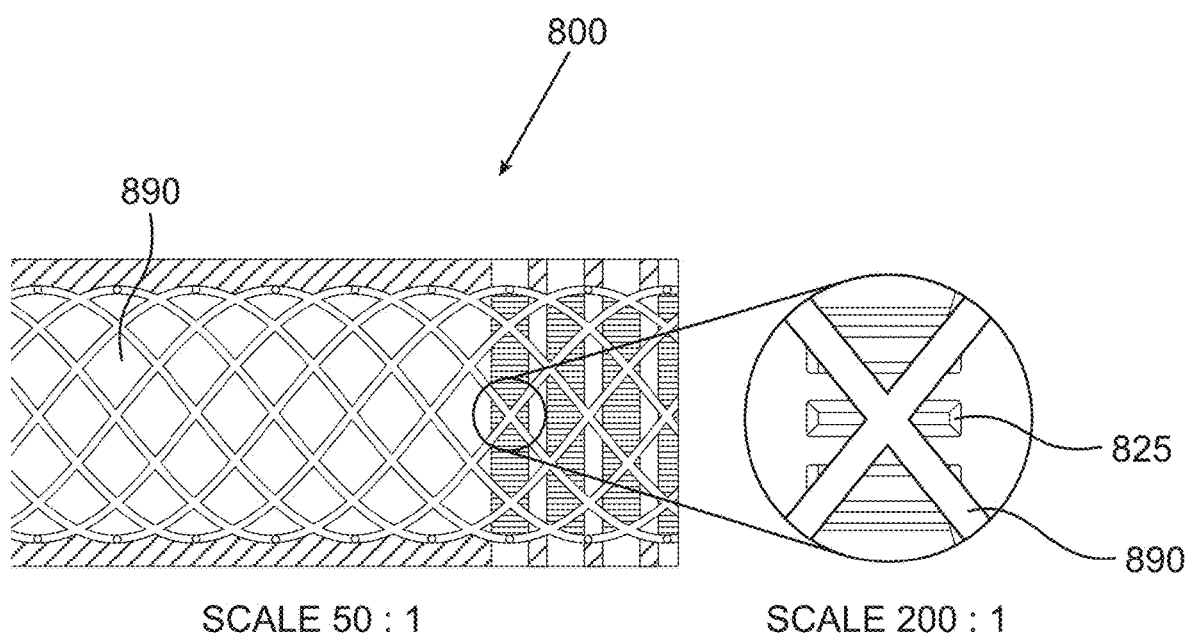
FIG. 8B schematically illustrates a side view of a detail of a filter of an embolization microcatheter, according to some embodiments.

As illustrated in FIG. 8A and FIG. 8B which show frontal and side detailed views of a filter 800 which may be essentially similar to any of the filters disclosed herein (e.g. filters 600, 700 and 900). As illustrated in FIG. 8A, side openings 825 may be essentially trapeze shaped, such that the cross section if each side opening at the inner surface of the filter is smaller than the cross section of the opening at the outer surface of the filter. According to some embodiments, the side openings may be formed by selective cutting (e.g. selective laser cutting), that is, without cutting the wires forming braid 890 as illustrated in FIG. 8B. According to some embodiments, the part of the liner positioned below the wires remains intact. According to some embodiments, both the polymeric layer and the inner liner positioned between the wires of braid 890 are penetrated when forming the slits. According to some embodiments, the resulting number of side-openings is greater than the number of side openings made in the polymeric layer. According to some embodiments, the resulting number of sub-side-openings is at least twice the number of side openings made in the polymeric layer. According to some embodiments, the resulting number of sub-side-openings is at least 4 times the number of side openings made in the polymeric layer.

Figure 9:
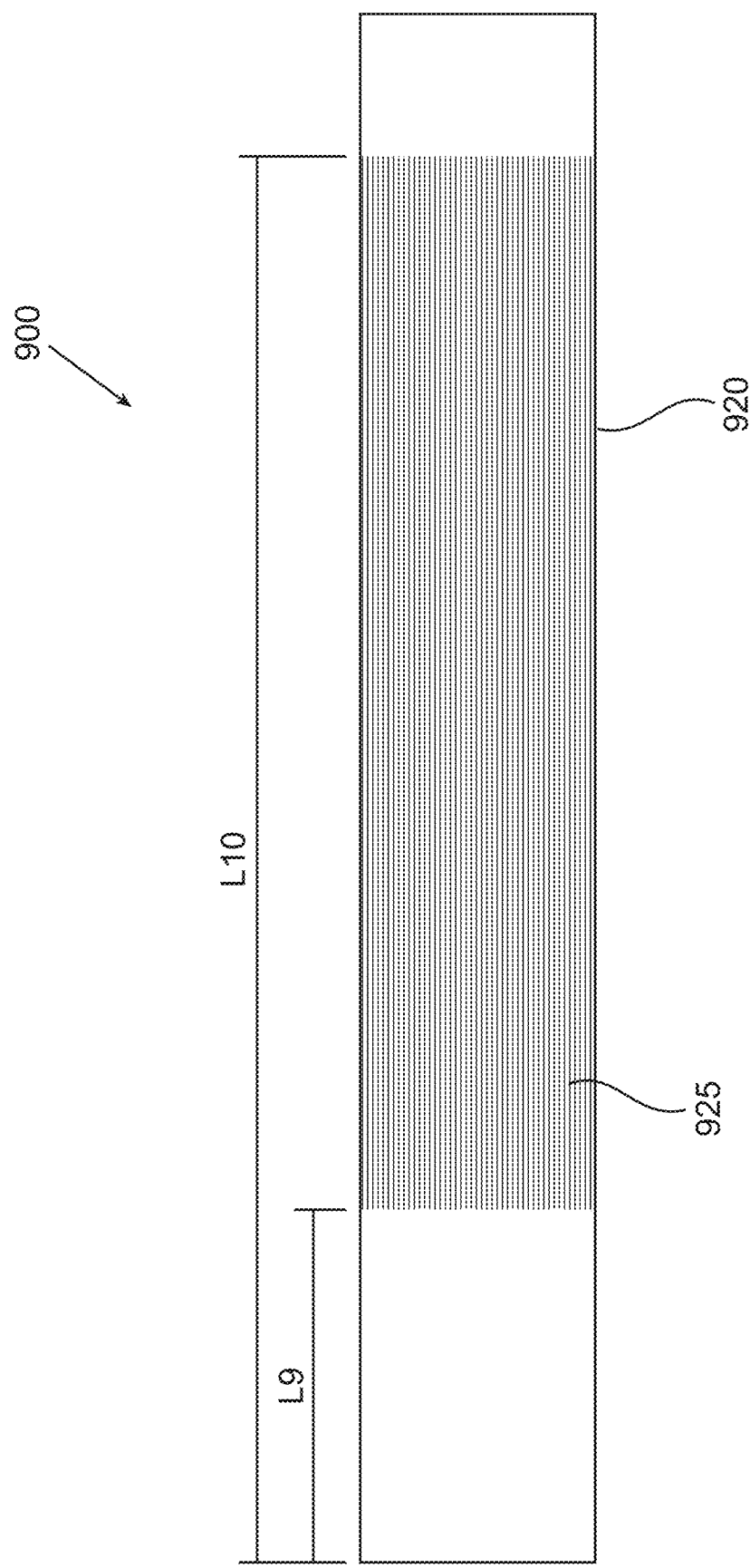
FIG. 9 schematically illustrates another optional slit pattern for an embolization microcatheter such as the embolization microcatheter of FIG. 2, according to some embodiments.

Reference is now made to FIG. 9, which schematically shows yet another optional structure of a filter 900 of an embolization microcatheter, such as microcatheter 200 of FIG. 2. According to some embodiments, filter 900 may include a single filter section 920 including a plurality of side openings, collectively referred to as side openings 925. According to some embodiments, filter section 920 includes 20-80, or 25-65 or 40-50 side openings (e.g. 45 side openings). According to some embodiments, the slits are axial slits. According to some embodiments, the slits are distributed in an annular ring. According to some embodiments, each of side opening 925 may have a width of 5 microns-15 microns or 5 microns-10 microns (e.g. 8 microns), as measured on the inner surface of the microcatheter. and a length L10 of 1-15 mm, 1-10 mm or 5-10 mm (e.g. 9 mm), as measured on the inner surface of the microcatheter.

According to some embodiments, the filter 900 may be positioned L9 mm i.e. about 1-10 mm or 2-8 mm, such as but not limited to about 3 mm from the distal end opening.

According to some embodiments, side openings 925 may be formed by selective cutting (e.g. selective laser cutting), that is, without cutting the wires forming skeleton 220. According to some embodiments, the polymeric layer positioned between the wires of skeleton 220 are penetrated when forming the slits. Advantageously, the selective cutting of the polymeric layer (leaving braid 200 essentially intact) may provide subdivision of at least some of the side-openings into two or more sub-side-openings separated by the braid but not by the polymeric outer layer, thereby de facto providing more than 100 side openings, more than 500 side openings or more than 1000 side openings.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" or "comprising", when used in this specification, specify the presence of stated features, integers, steps, operations, elements, or components, but do not preclude or rule out the presence or addition of one or more other features, integers, steps, operations, elements, components, or groups thereof. According to some embodiments, the term "comprising" may be replaced by the term "consisting essentially of" or "consisting of".

The term "about" refers to a reasonable variation from a stated amount that retains the ability to achieve one or more functional effect to substantially the same extent as the stated amount. The term may also refer herein to a value of plus or minus 10% of the stated value; or plus or minus 5%, or plus or minus 1%, or plus or minus 0.5%, or plus or minus 0.1%, or any percentage in between.

While a number of exemplifying aspects and embodiments have been discussed above, those of skill in the art will envisage certain modifications, additions and subcombinations thereof. It is therefore intended that the following appended claims and claims hereafter introduced be interpreted to include all such modifications, additions and sub-combinations as are within their true spirit and scope.

EXAMPLES

Example 1—Delivery of Sirtex Y90 Radioembolization Beads (Sir-Sphere®)

Reflux of beads using a microcatheter as disclosed in FIG. 3A-FIG. 3D, was compared to the reflux using a standard microcatheter, under the same test conditions.

Each microcatheter was inserted into a tube connected in its distal end to a filter consisting of a large mesh for collecting the injected beads and a flow regulator that maintained a constant flow rate of 5 cc/min in the tube. Sirtex Y90 (25 micron) beads (Sir-Sphere®) were injected in a constant flow rate of 5-10 cc/min using a syringe pump and the injection was recorded and reflux of beads monitored.

When using a standard microcatheter, the reflux began at an injection flow rate just higher than 5 cc/min, while when using the herein disclosed microcatheter, no reflux was observed even at an injection flow rate as high as 9 cc/min.

Figure 10:
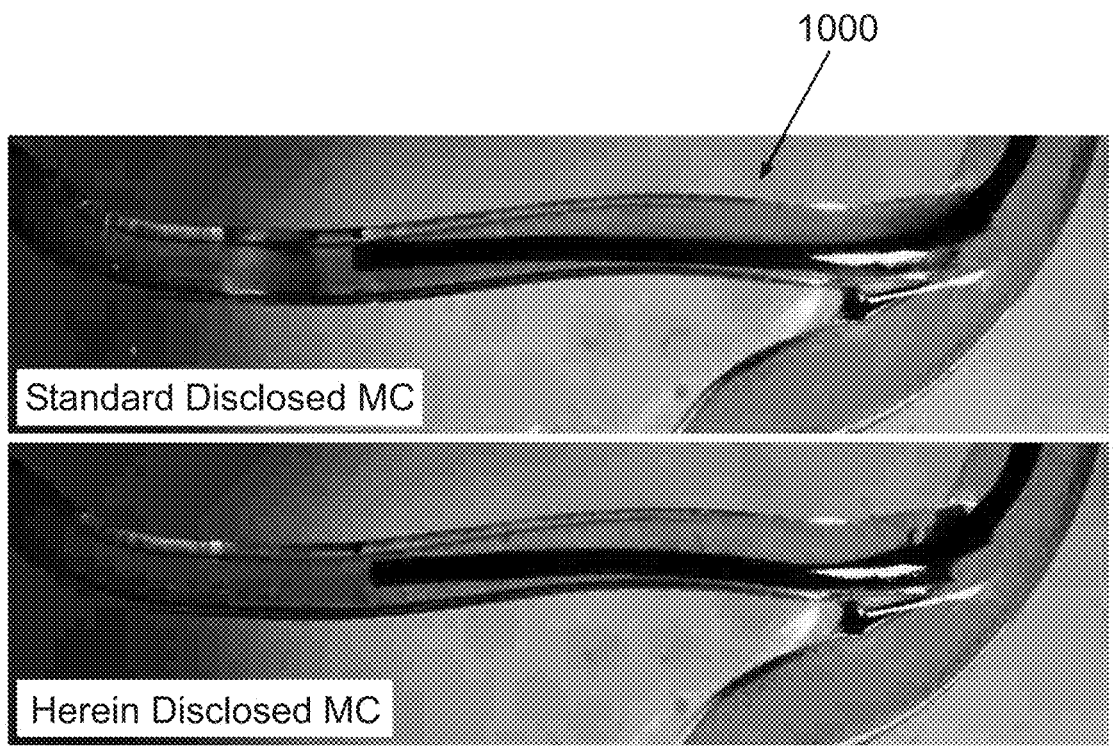
FIG. 10 shows comparative time snap-shots photos of bead backflow during delivery of Sirtex Y90 (25 micron) beads (Sir-Sphere®) using a Standard microcatheter devoid of a filter section as herein disclosed (Standard MC, upper panel) as compared to the hereindisclosed microcatheter (hereindisclosed, lower panel)

FIG. 10 shows representative images captured at various time points when monitoring reflux of Sirtex Y90 beads using the herein disclosed embolization microcatheter (herein disclosed MC—lower panel) and a standard microcatheters (standard MC—upper panel). It may be clearly seen that reflux is significantly prevented when using the herein disclosed microcatheter, as compared to standard microcatheters (refluxed beads are indicated by arrow 1000) As further seen from FIG. 11 when using the hereindisclosed microcatheter, reflux of Sirtex Y90 beads (Sir-Sphere®) occurs only at an injection rate×1.8 times higher than with a standard microcatheter (~9 ml/min as compared to ~5 ml/min).

Example 2—Delivery of Celonova Embozene 40 Microns Bland-Embolization Beads

Reflux of beads using a microcatheter as disclosed in FIG. 3A-FIG. 3D, was compared to the reflux using a standard microcatheter, under the same test conditions.

Each microcatheter was inserted into a tube connected in its distal end to a filter consisting of a large mesh for collecting the injected beads and a flow regulator that maintained a constant flow rate of 5 cc/min in the tube. Embozene® 40 microns beads were injected in a constant flow rate of 5-10 cc/min using a syringe pump and the injection was recorded and reflux of beads monitored.

When using a standard microcatheter, the reflux began at an injection flow rate just higher than 5 cc/min, while when using the herein disclosed microcatheter, no reflux was observed in injection flow rate of up to 9 cc/min.

Figure 11:
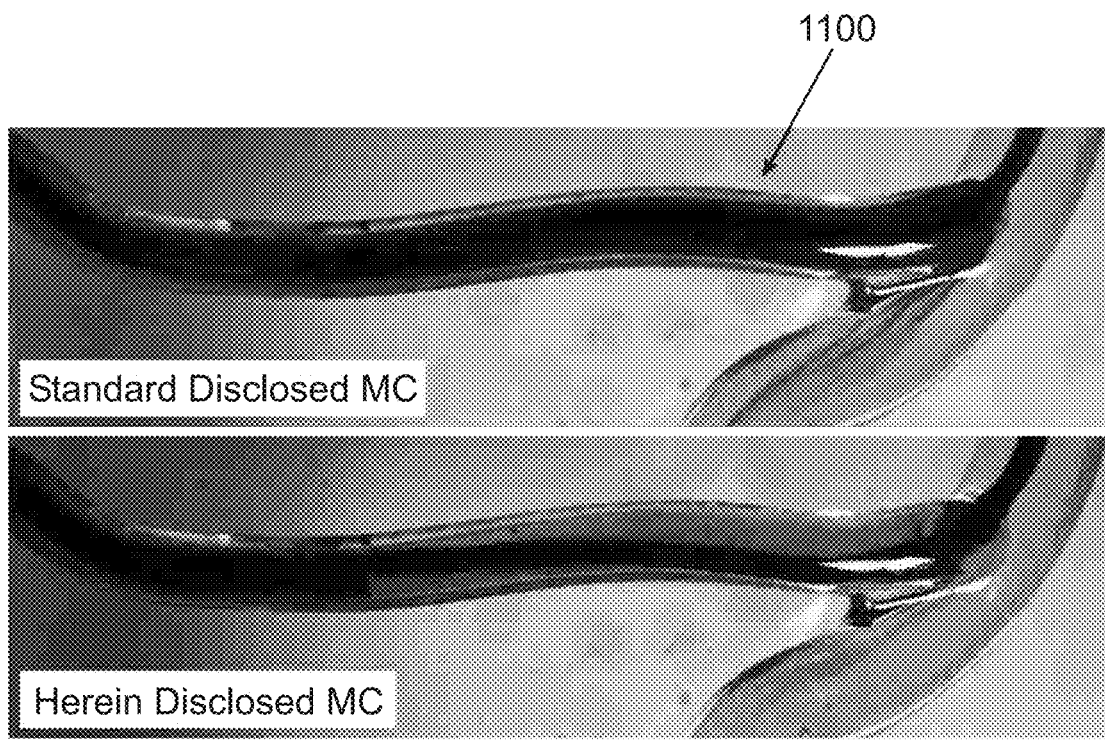
FIG. 11 shows comparative time snap-shots photos of bead backflow during delivery of Embozene® 40 microns beads using a Standard microcatheter (Standard MC, upper panel) as compared to the hereindisclosed microcatheter (hereindisclosed, lower panel)
Figure 12:
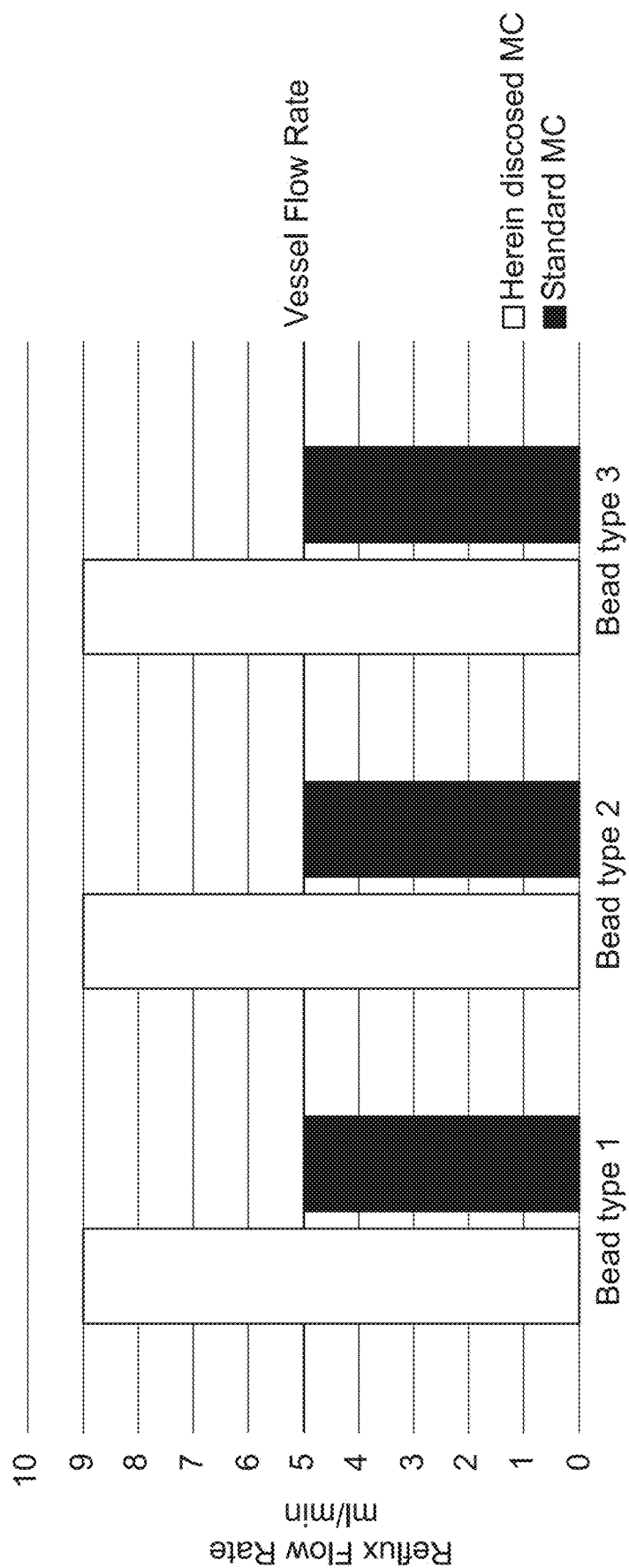
FIG. 12 is a comparative graph showing the flow rate causing reflux of different beads using the hereindisclosed microcatheter as compared to a standard microcatheter.

FIG. 11 shows representative images captured at various time points when monitoring reflux of Embozene® 40 microns beads using the herein disclosed embolization microcatheter (lower panel) and standard microcatheters (upper panel). It may be clearly seen that reflux is significantly prevented when using the herein disclosed microcatheter, as compared to standard microcatheters (refluxed beads are indicated by arrow 1100). As further seen from FIG. 12 when using the herein disclosed microcatheter of FIG. 3A (white bars), reflux of Sir-Sphere® (shown as bead type 1 in FIG. 12), TheraSpheres® beads (shown as bead type 2 in FIG. 12), and Embozene® beads (shown as bead type 3 in FIG. 12) occurs only at an injection rate×1.8 times higher than when using a standard microcatheter (black bars) (~9 ml/min as compared to ~5 ml/min).

The invention claimed is:

1. An embolization microcatheter for a delivery of embolization beads to a target area, the embolization microcatheter comprising:
   a proximal end and a distal end, the distal end comprising an end opening; and
   a skeleton formed of braided or coiled wires;
   a polymeric layer intercalated into and/or overlaying the skeleton; and
   a filter located in proximity to the end opening of the distal end; the filter comprising at least 100 openings distributed circumferentially around a wall thereof in at least 5 discrete annular rings; wherein each annular ring comprises at least 30 openings and a total open area of the filter is at least 3 times larger than an area of the end opening of the distal end.

2. The embolization microcatheter of claim 1, wherein the proximal end is sized and shaped to allow a delivery of a suspension flowing through the embolization microcatheter, wherein the suspension comprises a suspension fluid and the embolization beads, and wherein the filter is configured to allow an outflow of the suspension fluid while preventing an outflow of the embolization beads.

3. The embolization microcatheter of claim 1, wherein the total open area of the filter comprises at least 10% thereof.

4. The embolization microcatheter of claim 3, wherein the total open area of the filter is at least 5 times larger than an area of the end opening of the distal end.

5. The embolization microcatheter of claim 1, wherein the embolization microcatheter has a tensile breaking force of at least 5 N.

6. The embolization microcatheter of claim 1, wherein the at least 100 openings are axially distributed.

7. The embolization microcatheter of claim 1, wherein the skeleton has a thickness of 30-50 microns.

8. The embolization microcatheter of claim 1, further comprising an inner layer lining an inner surface of the embolization microcatheter and wherein the filter is devoid of the inner layer.

9. The embolization microcatheter of claim 1, wherein a width of each of the at least 100 openings is in the range of about 5-20 microns.

10. The embolization microcatheter of claim 1, wherein the filter comprises at least 1000 openings.

11. The microcatheter of claim 1, wherein the at least 100 openings are essentially bone shaped or bead-on-string shaped.

12. The microcatheter of claim 1, comprising at least two longitudinally spaced-a-part filter sections.

13. An embolization microcatheter for a delivery of embolization beads to a target area, the embolization microcatheter comprising:

a proximal end and a distal end, the distal end comprising an end opening; and a skeleton formed of braided or coiled wires;

a polymeric layer intercalated into and/or overlaying the skeleton; and a filter located in proximity to the end opening of the distal end; the filter comprising a first distal most filter section comprising at least 500 openings, a second middle filter section comprising at least 2000 openings and a third proximal most filter section comprising at least 1000 openings, wherein a total open area of the filter is at least 3 times larger than an area of the end opening of the distal end.

* * * * *